United States Patent [19]

Tsuboyama et al.

[11] Patent Number: 5,165,076
[45] Date of Patent: Nov. 17, 1992

[54] FERROELECTRIC LIQUID CRYSTAL DEVICE WITH PARTICULAR PRIMER ALIGNMENT, AND LIQUID CRYSTAL LAYERS

[75] Inventors: Akira Tsuboyama, Sagamihara; Yutaka Inaba, Kawaguchi; Akio Yoshida, Chigasaki; Yukio Hanyu; Toshiharu Uchimi, both of Atsugi; Masataka Yamashita, Hiratsuka, all of Japan

[73] Assignee: Canon Kabushiki Kaisha, Tokyo, Japan

[21] Appl. No.: 415,971

[22] Filed: Oct. 2, 1989

Related U.S. Application Data

[62] Division of Ser. No. 205,292, Jun. 10, 1988.

[30] Foreign Application Priority Data

| Jun. 12, 1987 | [JP] | Japan | 62-146372 |
| Jul. 2, 1987 | [JP] | Japan | 62-166416 |
| Jul. 30, 1987 | [JP] | Japan | 62-188906 |
| Dec. 14, 1987 | [JP] | Japan | 62-314099 |
| Dec. 15, 1987 | [JP] | Japan | 62-315268 |

[51] Int. Cl.$^5$ .............. G02F 1/1333; G02F 1/1337; G02F 1/13
[52] U.S. Cl. .................... 359/75; 359/74; 359/100
[58] Field of Search ............ 350/341, 340, 350 S, 350/339 R

[56] References Cited

U.S. PATENT DOCUMENTS

| 3,966,305 | 6/1976 | Young | 350/341 |
| 4,367,924 | 1/1983 | Clark et al. | 350/350 S |
| 4,561,726 | 12/1985 | Goodby et al. | 359/75 |
| 4,576,732 | 3/1986 | Isogai et al. | 350/350 S |
| 4,614,609 | 9/1986 | Inoue et al. | 350/350 S |
| 4,615,586 | 10/1986 | Geary et al. | 359/100 |
| 4,664,480 | 5/1987 | Geary et al. | 359/74 |
| 4,720,173 | 1/1988 | Okada et al. | 359/76 |
| 4,723,839 | 2/1988 | Nakanowatari et al. | 359/76 |
| 4,732,699 | 3/1988 | Higuchi et al. | 359/81 |
| 4,738,515 | 4/1988 | Okada et al. | 359/56 |
| 4,759,614 | 7/1988 | Yokukura et al. | 350/341 |
| 4,796,979 | 1/1989 | Tsuboyama | 350/340 |
| 4,797,228 | 1/1989 | Goto et al. | 252/299.63 |
| 4,798,680 | 1/1989 | Nohira et al. | 252/299.01 |
| 4,850,680 | 7/1989 | Yamazaki et al. | 350/340 |
| 4,886,623 | 12/1989 | Mitsuhashi et al. | 350/350 S |
| 4,902,106 | 2/1990 | Dijon et al. | 350/341 |
| 4,917,821 | 4/1990 | Mori et al. | 350/350 S |
| 4,932,757 | 6/1990 | Hanyu et al. | 350/341 |

FOREIGN PATENT DOCUMENTS

| 0208293 | 1/1987 | European Pat. Off. | |
| 0225470 | 6/1987 | European Pat. Off. | |
| 3508169 | 9/1985 | Fed. Rep. of Germany | |
| 0007749 | 1/1977 | Japan | 350/341 |
| 0040152 | 3/1977 | Japan | 350/339 R |
| 00035631 | 1/1979 | Japan | 350/341 |
| 0066472 | 4/1982 | Japan | 350/339 R |
| 0172621 | 10/1983 | Japan | 350/339 R |

Primary Examiner—Stanley D. Miller
Assistant Examiner—Anita Pellman Gross
Attorney, Agent, or Firm—Fitzpatrick, Cella, Harper & Scinto

[57] ABSTRACT

A ferroelectric liquid crystal device comprises a pair of opposite electrodes and a ferroelectric liquid crystal disposed between the electrodes. At least one of the opposite electrodes is coated with a primer layer and an alignment layer on the primer layer. The alignment layer has a thickness $d_2$ and is made of a material having a dielectric constant $\epsilon_2$, and the primer layer has a thickness $d_1$ and is made of a material having a dielectric constant $\epsilon_1$ which are greater than $d_2$ and $\epsilon_2$, respectively. The ferroelectric liquid crystal is at least one mesomorphic compound represented by the formula $R_1-A_1-X-A_2-R_2$ wherein $A_1$ and $A_2$ respectively denote a 6-membered ring-containing divalent group; X denotes a single bond or a divalent chain group; and $R_1$ and $R_2$ respectively denote a branch or linear chain group, $R_1$ and $R_2$ being the same or different.

18 Claims, 9 Drawing Sheets

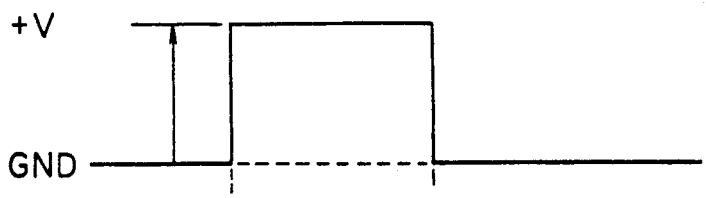
FIG.8(a)
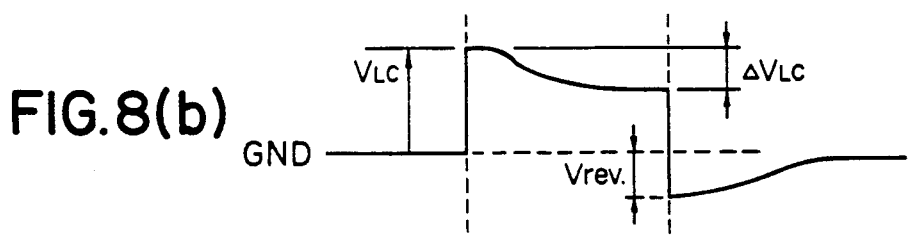
FIG.8(b)
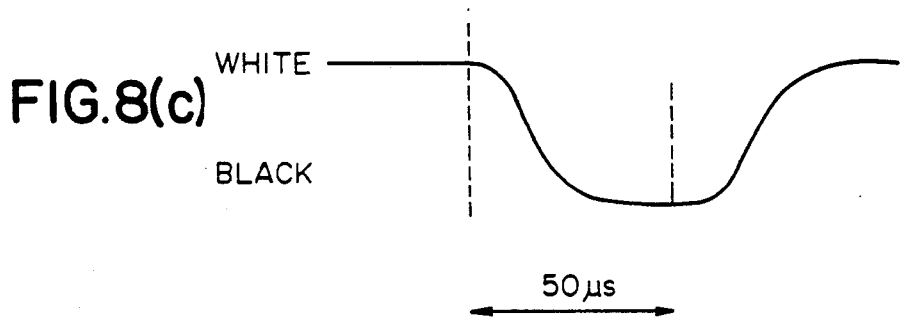
FIG.8(c)
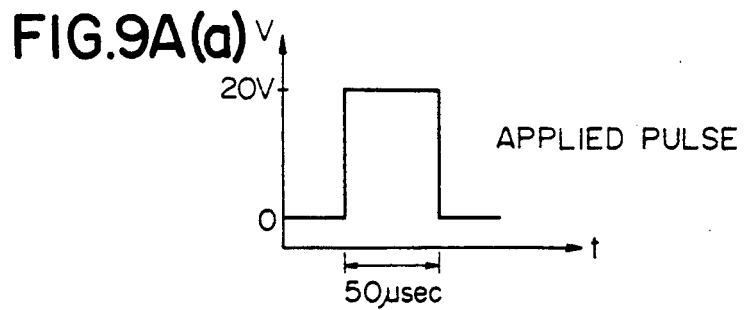
FIG.9A(a) APPLIED PULSE
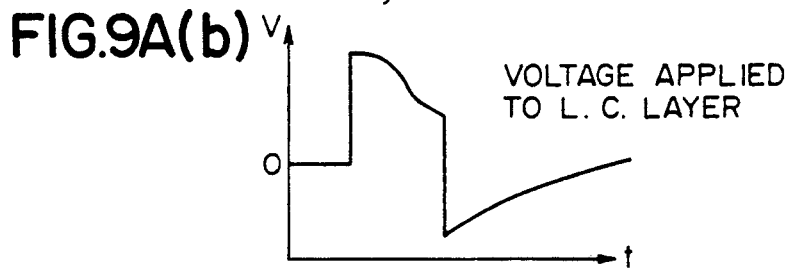
FIG.9A(b) VOLTAGE APPLIED TO L.C. LAYER
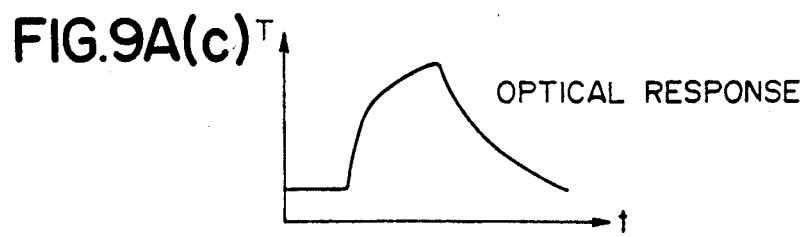
FIG.9A(c) OPTICAL RESPONSE

5,165,076

FERROELECTRIC LIQUID CRYSTAL DEVICE WITH PARTICULAR PRIMER ALIGNMENT, AND LIQUID CRYSTAL LAYERS

This application is a division of application Ser. No. 205,292, filed Jun. 10, 1988.

FIELD OF THE INVENTION AND RELATED ART

The present invention relates to a ferroelectric liquid crystal device, particularly a ferroelectric liquid crystal device having been improved with respect to switching failure in multiplex driving.

Clark and Lagerwall have proposed a liquid crystal device showing bistability (U.S. Pat. No. 4,367,924; Japanese Laid-Open Patent Appln. JP-A (Kokai) Sho.56-107216, etc.)

As the bistable liquid crystal, a ferroelectric liquid crystal showing a chiral smectic C phase (SmC*) or H phase (SmH*) is generally used.

Such a ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to several difficulties involved in the conventional TN-type liquid crystal device, such as poor visual angle characteristic.

In order to apply such a ferroelectric liquid crystal device to a display panel of a large area, e.g., a panel with more than 100 scanning lines driven at a frame frequency of 30 Hz (e.g., as disclosed in U.S. Pat. Nos. 4,548,476; 4,655,561; etc.), it is necessary to use a ferroelectric liquid crystal with a high-speed responsiveness. For this purpose, the ferroelectric liquid crystal is required to have a spontaneous polarization Ps of 2 nC/cm² or larger, preferably 10 nC/cm² or larger for a panel with an even higher pixel density.

Incidentally, in a ferroelectric liquid crystal device provided with a bistable condition as described above, the liquid crystal layer is disposed in a very small thickness of generally 2 μm or less. Therefore, a problem of short circuit has occurred between upper and lower electrodes because of fine particles commingled into the device. For this reason, it has been considered necessary to coat the respective electrodes with an insulating film for prevention of short circuit in a thickness of 200 Å or larger, particularly 500 Å or larger, with an insulating material as will be described hereinafter.

According to our experiments, however, it has been observed that an inversion switching from a first orientation state to a second orientation state of a ferroelectric liquid crystal is hindered by the presence of a 200Å or thicker insulating film as described above, particularly an inorganic insulating film, and the tendency of the hindrance becomes more noticeable as a ferroelectric liquid crystal having a layer spontaneous polarization is used. As a result, the increase in spontaneous polarization of a ferroelectric liquid crystal as required for enlargement of a ferroelectric liquid crystal panel has been restricted from this viewpoint.

Further, in order that optical modulation device in which a liquid crystal having bistability is used can realize desired driving characteristics, it is required that a liquid crystal disposed between a pair of parallel base plates has a molecule arrangement such that molecules can effectively be switched between the two stable states independent of the application of an electric field. For instance, in connection with ferroelectric liquid crystals having SmC*- or SmH*-phase, it is required that there is formed a region (monodomain) where liquid crystal layers having SmC*- or SmH*-phase are vertical to the surfaces of base plates, i.e., the liquid crystal axis is aligned substantially in parallel with the surfaces.

As a method for alignment of a ferroelectric liquid crystal, it has been known to use an alignment control film provided with a uniaxial orientation or aligning treatment, such as rubbing or oblique vapor deposition. A known alignment control film has been composed of a dielectric material such as aromatic polyimide, polyamide, polyvinyl alcohol, etc.

According to our experiment, or normal switching action has failed in multiplex driving when an alignment control film of such an ordinary dielectric material is used.

SUMMARY OF THE INVENTION

An object of the present invention is to provide a liquid crystal device having solved the above-mentioned problems.

A more specific object of the present invention is to ensure prevention of short circuit between upper and lower electrodes and also provide an improved switching characteristic in a liquid crystal device for multiplex driving comprising upper and lower substrates each provided with a large number of electrodes and a ferroelectric liquid crystal is disposed between the electrodes.

According to the present invention, there is provided a ferroelectric liquid crystal device, comprising: a pair of opposite electrodes at least one of which is coated with an insulating film having a thickness of 200 Å or larger, and a ferroelectric liquid crystal disposed between the opposite electrode; the improvement wherein said ferroelectric liquid crystal has a capacitance $C_{LC}$ (nF/cm²) and a spontaneous polarization Ps (nC/cm²), and said insulating film has a capacitance Ci (nF/cm²) satisfying the relationship of $$Ci(nF/cm^2) \geq 2 \cdot Ps(nC/cm^2) - C_{LC}(nF/cm^2),$$

preferably $$Ci(nF/cm^2) \geq 7 \cdot Ps(nC/cm^2) - C_{LC}(nF \cdot cm^2).$$

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 8(a)-8(c) are a characteristic view showing an electric-optical effect of a ferroelectric liquid crystal;

FIGS. 9A(a)-9A(c) are a characteristic view showing an electro-optical effect of a ferroelectric liquid crystal device outside the present invention.

DESCRIPTION OF THE PREFERRED EMBODIMENTS

Figure 1:
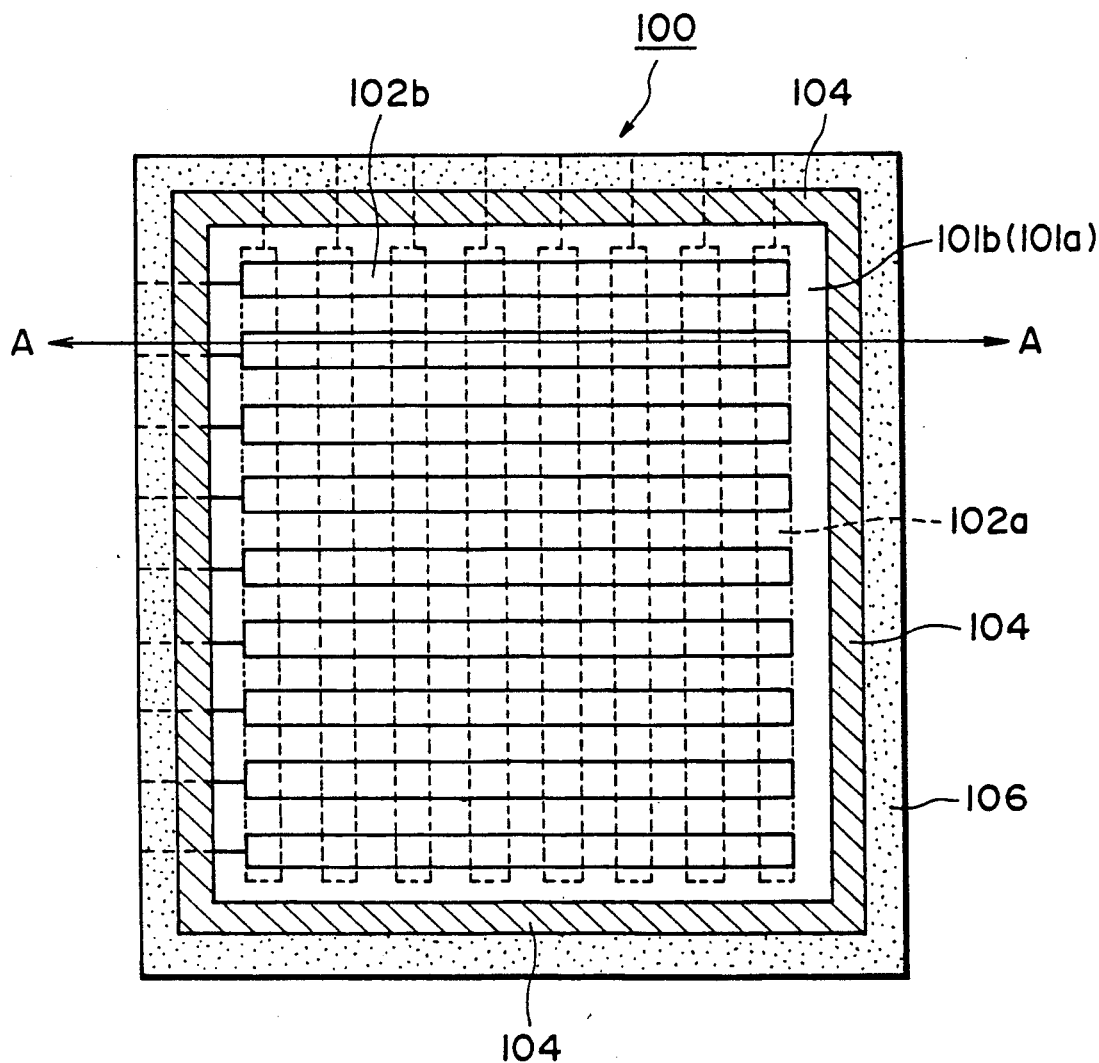
FIG. 1 is a plan view of an embodiment of the liquid crystal device according to the present invention.

FIG. 1 is a plan view of an embodiment of the liquid crystal device according to the present invention, and FIGS. 2A -2E are sectional views respectively taken along the line A—A in FIG. 1 and each showing a sectional view of an embodiment of the liquid crystal device.

Referring to FIG. 1 and any one of FIGS. 2A-2E, a cell structure 100 comprises a pair of substrates 101a and 101b made of glass plates or plastic plates which are held with a predetermined gap with spacers 104 and sealed with an adhesive 106 to form a cell structure. On the substrate 101a is further formed an electrode group (e.g., an electrode group for applying scanning voltages of a matrix electrode structure) comprising a plurality of transparent electrodes 102a in a predetermined pattern, e.g., of a stripe pattern. On the substrate 101b is formed another electrode group (e.g., an electrode group for applying signal voltages of the matrix electrode structure) comprising a plurality of transparent electrodes 102b crossing the transparent electrodes 102a.

In the present invention, at least one group of the transparent electrodes 102a and 102b may be coated with an insulating film as described above as an alignment control film or insulating film for preventing short circuit.

Figure 2A:
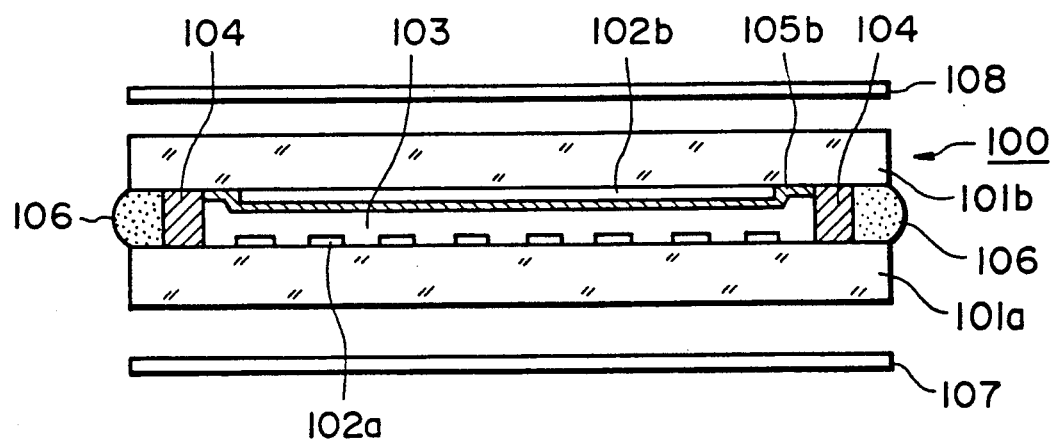
FIGS. 2A-2E are sectional views taken along the line A—A in FIG. 1 and each showing a sectional structure of an embodiment of the device.
Figure 2B:
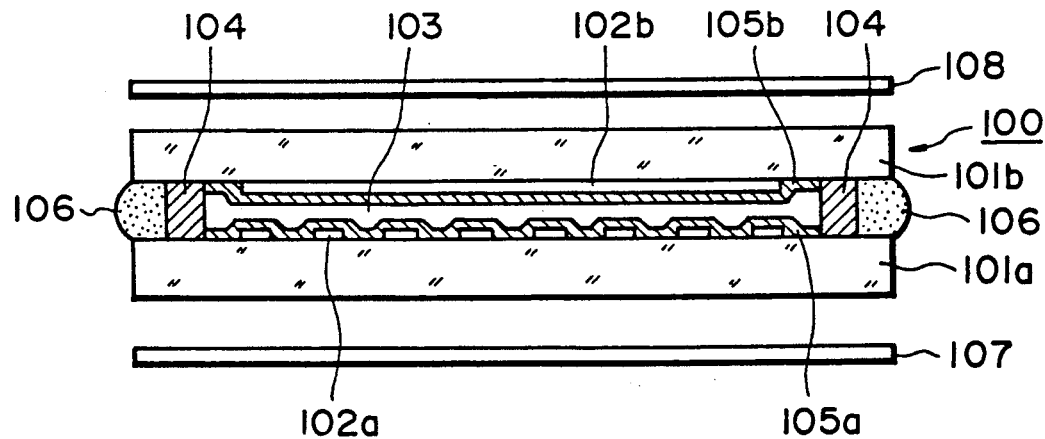
Figure 2C:
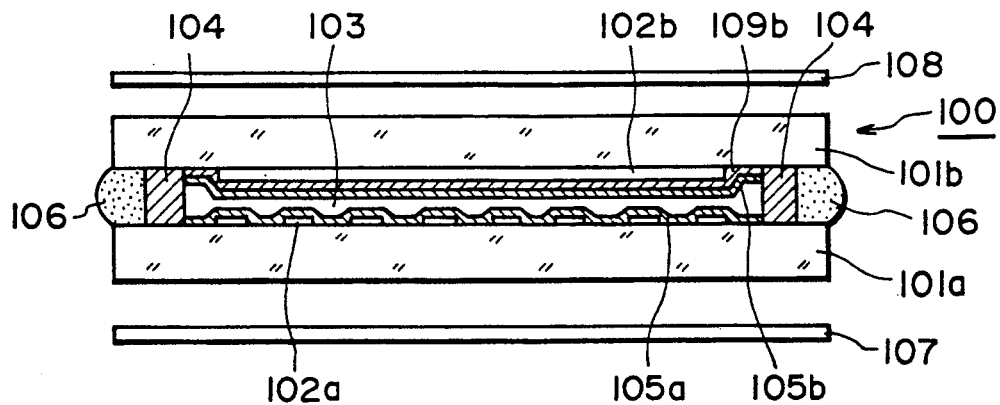
Figure 2D:
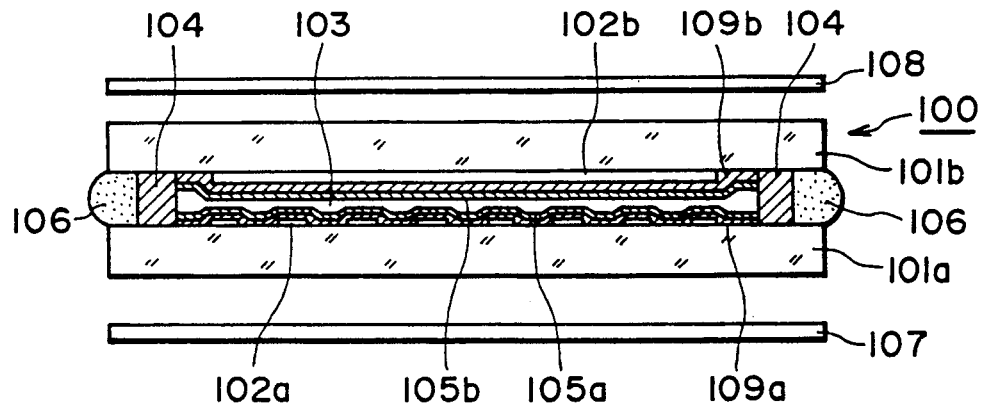
Figure 2E:
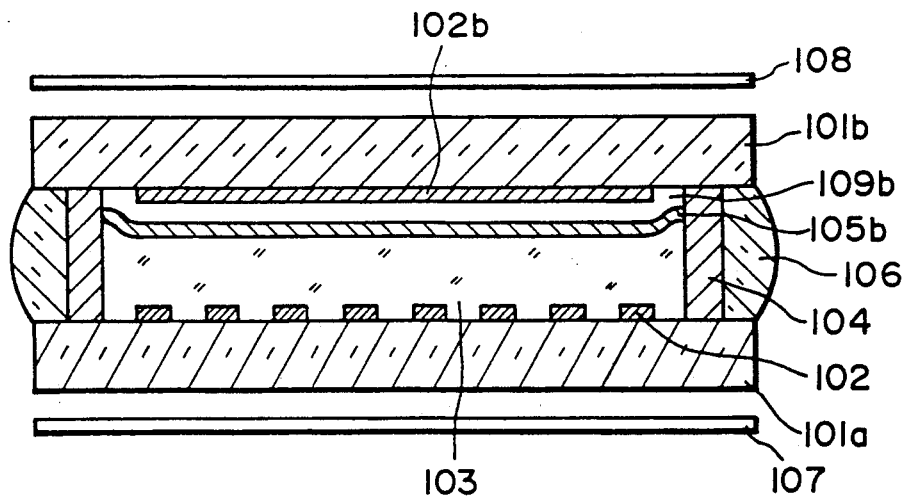

The device of FIG. 2A has an alignment control film 105b disposed on one substrate 101b; the device of FIG. 2B has alignment control films 105a and 105b disposed on both substrates 101a and 101b; the device of FIG. 2C has an insulating film for short circuit prevention 109b and an alignment control film 105b on one substrate 101b and an alignment control film 105a on the other substrate 101a; the device of FIG. 2D has insulating films for short circuit prevention 109a and 109b and alignment control films 105a and 105b on both substrates 101a and 101b; and the device of FIG. 2E has an insulating film for short circuit prevention 109b and an alignment control film 105b thereon on only one substrate 105b.

The alignment control films 105a and 105b may be composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, polyethylene, cellulose resin, melamine resin, urea resin and acrylic resin. The above-mentioned film of an inorganic insulating material can also function as an insulating film for short circuit prevention. Particularly, in the liquid crystal devices shown in FIGS. 2A and 2B, the alignment films 105a and 105b are composed of an inorganic insulating film showing functions of alignment control and short circuit prevention in combination.

The alignment control films 105a and 105b may be formed by first forming a film of an inorganic insulating material or an organic insulating material as described above and then rubbing the surface thereof in one direction with velvet, cloth, paper, etc., to provide the films with a uniaxial orientation axis.

In a preferred embodiment of the present invention, the alignment control films 105a and 105b may comprise a polyimide as disclosed in U.S. Pat. Nos. 2,710,853; 2,712,543; 2,900,369; 3,073,784; 3,179,643; etc. A preferred class of polyimides are those having structural units represented by the following formula (I):

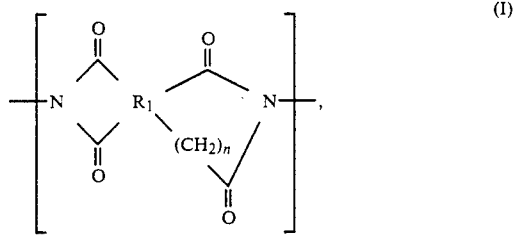

wherein $R_1$ is a tetravalent aliphatic group, and n is 0 or 1. The polyimide having a structural unit represented by the above formula (I) may be synthesized by dehydro-cyclization (i.e., dehydration and ring-closure) of a so-called polyamic acid which is a polycondensation product of a tetracarboxylic acid anhydride and a diamine.

The method of polymerization for causing the polycondensation is not particularly restricted, but any of solution polymerization, interfacial polymerization, bulk polymerization and solid phase polymerization can be adopted. Further, the above polyimide formation reaction may be effected as a one-stage process without isolation of the intermediately produced polyamic acid or as a two-stage process wherein the produced polyamic acid is isolated and then subjected to dehydration-ring closure into a polyimide.

A generally preferred process for the polymerization is a solution process. The solvent for the solution may be any as far as it dissolves the produced polyamic acid. Typical examples of the solvent may include: N,N-dimethylformamide, N,N-dimethylacetamide, N-methylpyrrolidone, N-methylcaprolactam, dimethyl sulfoxide, tetramethylurea, pyridine, dimethylsulfolane, hexamethylphosphoramide, and butyrolactone. These solvents may be used singly or in mixture. Further, a solvent not dissolving a polyamic acid by itself can be added to a solvent as mentioned above within an extent that the resultant solvent mixture can dissolve the polyamic acid.

The reaction temperature of the polycondensation for production of the polyamic acid may be selected at any in the range of $-20°$ C. to $150°$ C., particularly in the range of $-5°$ C. to $100°$ C.

For the present invention, the polyamic acid may be converted into a polyimide through dehydrocyclization ordinarily under heating. The temperature for the dehydro-cyclization may be selected at any of $150°$ C.$-400°$ C., preferably $170°$ C.$-350°$ C. The reaction period required for the dehydrocyclization may suitably be 30 seconds to 10 hours, preferably 5 minutes to 5 hours while it also depends on the above-mentioned reaction temperature. The conversion of the polyamic acid into the polyimide may also be promoted by means of a dehydro-cyclization catalyst. These methods may be effected under ordinary conditions for polyimide synthesis without particular restriction.

Hereinbelow, specific examples of aliphatic tetracarboxylic acid dianhydrides and diamines are enumerated.

(1) aliphatic tetracarboxylic acid dianhydride:

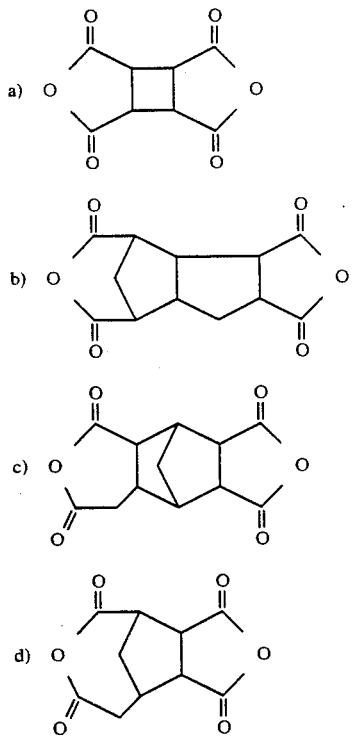

(2) diamine compounds:

The diamines used in the present invention are not particularly restricted as far as the object of the present invention is not hindered thereby. Representative examples of the aromatic diamine which can be used for this purpose may include: paraphenylenediamine, methaphenylenediamine, 4,4'-diaminodiphenylmethane, 4,4'-diaminodiphenylethane, benzidine, 4,4'-diaminodiphenyl sulfide, 4,4'-diaminodiphenylsulfone, 4,4'-diaminodiphenyl ether, 1,5-diaminonaphthalene, 3,3'-dimethyl-4,4'-diaminobiphenyl, 3,4'-diaminobenzanilide, 3,4'-diaminodiphenyl ether, methaxylylenediamine, paraxylylenediamine, ethylenediamine, 1,3-propanediamine, tetramethylenediamine, pentamethylenediamine, hexamethylenediamine, heptamethylenediamine, octamethylenediamine, nonamethylenediamine, 4,4'-dimethylheptamethylenediamine, 1,4'-diaminocyclohexane, tetrahydrodicyclopentadienylenediamine, hexahydro-4,7-methanoisobutylenedimethylenediamine, tricyclo$(6,2,1,0^{2,7})$-undecylenedimethyldiamine, etc.

The polyimide resin used in the present invention may comprise a small amount of copolymerization units (such as amide units, other polymer units generally contained) in its polymer chain.

As the method for forming the film of these polyimides, it is possible to use a method in which a solution of a polyamic acid, i.e., a polyimide precursor, dissolved in an appropriate solvent at a proportion of 0.1 wt. % to 20 wt. %, preferably 0.2 to 10 wt. %, is applied according to spinner coating, dip coating, screen printing, spray coating or roller coating, and then cured under predetermined curing conditions (e.g., heating). Alternatively, a polyimide soluble in a solvent such as N-methylpyrrolidone or γ-butyrolactone can be applied as a solution of the polyimide itself after the polyimide ring formation instead of a polyamic acid thereof.

In order to provide a polymer film such as a polyimide film with a uniaxial orientation treatment to form an alignment control film 105a or 105b, a rubbing treatment may preferably be used.

In a preferred embodiment of the present invention, a film of a polyorganosilane may be disposed between the insulating film for short circuit prevention 109a (or 109b) and an alignment control film 105a (or 105b). The organosilane used for this purpose may be one or more species of organosilanes represented by the general formula $R^2SiX_{4-m}$ (m=1, 2, 3), wherein X denotes a halogen, alkoxy (methoxy or ethoxy) or acetoxy; and $R^2$ denotes an aliphatic hydrocarbon group such as methyl, ethyl, vinyl or alkenyl, or an aromatic hydrocarbon group such as phenyl. A polyorganosilane film may be formed by applying a solution of an organosilane monomer or prepolymer dissolved in a solvent such as benzene, toluene or xylene at a concentration of 0.1–20 wt. %, followed by heating.

The alignment circuit of the above-mentioned ferroelectric liquid crystal devices is one comprising a series coupling of capacitors respectively corresponding to the insulating films for short circuit prevention 109a, 109b, alignment control films 105a, 105b and ferroelectric liquid crystal layer 103. Herein, based on the relationship between the capacitance of the laminate of the films 109 (109a or 109b) and 105 (105a or 105b) and the capacitance of the ferroelectric liquid crystal layer 103, a voltage waveform applied to the ferroelectric liquid crystal layer in response to an externally applied voltage is determined. More specifically, as the capacitance of the above-mentioned laminate is larger, the bistability of the ferroelectric liquid crystal is improved.

According to this embodiment, it is possible to increase the capacitance of the laminate while decreasing the thickness of the film to 500 Å or less to suppress the loss of capacitance.

According to another embodiment of the present invention, at least one of the alignment control films 105a and 105b may be formed of a low-resistivity dielectric. In this instance, the volume resistivity of the alignment control film 105a or 105b may preferably be set to $10^{10}$ Ω·cm or below. The volume resistivity is based on values measured according to ASTM-Designation: D-257-78 (Re-approved 1983).

Figure 10A:
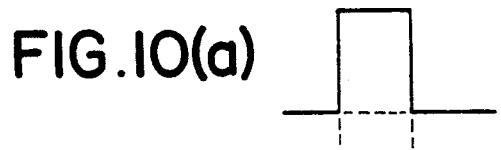
FIGS. 10(a)-10(c) are a voltage waveform diagram of driving pulses.
Figure 10B:
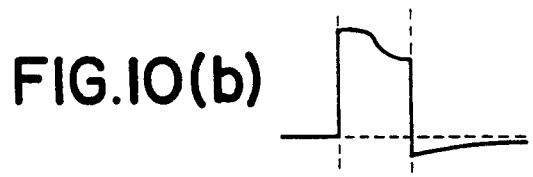
Figure 10C:
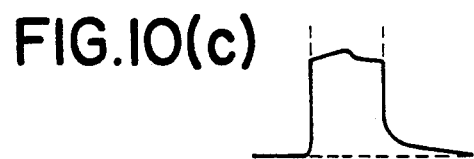

FIG. 10 is a diagram showing voltage waveforms when an FLC (ferroelectric liquid crystal) is inverted from its first orientation state to the second orientation state by applying a single polarity pulse. Referring to FIG. 10, when a drive pulse shown at (a) is applied, the liquid crystal layer is effectively supplied with a voltage waveform as shown at (a) or (b) depending on the cell structure. When the upper and lower insulating films for short circuit prevention are composed of an ordinary dielectric as described above, the liquid crystal layer is supplied with a voltage component of a polarity reverse to that of an applied pulse as shown at (b) after the termination of the applied pulse. On the other hand, according to a cell construction of the present invention, the liquid crystal layer is supplied with a voltage supporting a drive consecutively after the termination of the pulse as shown at (c), whereby the switching is stably effected.

The alignment control films 105a and 105b according to this embodiment may preferably comprise a film of polyimide, polyvinyl alcohol, polyamide-imide, polyester, polyamide or $SiO_2$.

In another preferred embodiment according to the present invention, the alignment control films 105a and 105b may be formed as films of an inorganic insulating material such as SiO or $SiO_2$ on the substrates 101a and 101b by the oblique or tilt vopor deposition to be provided with a uniaxial orientation axis.

Figure 3:
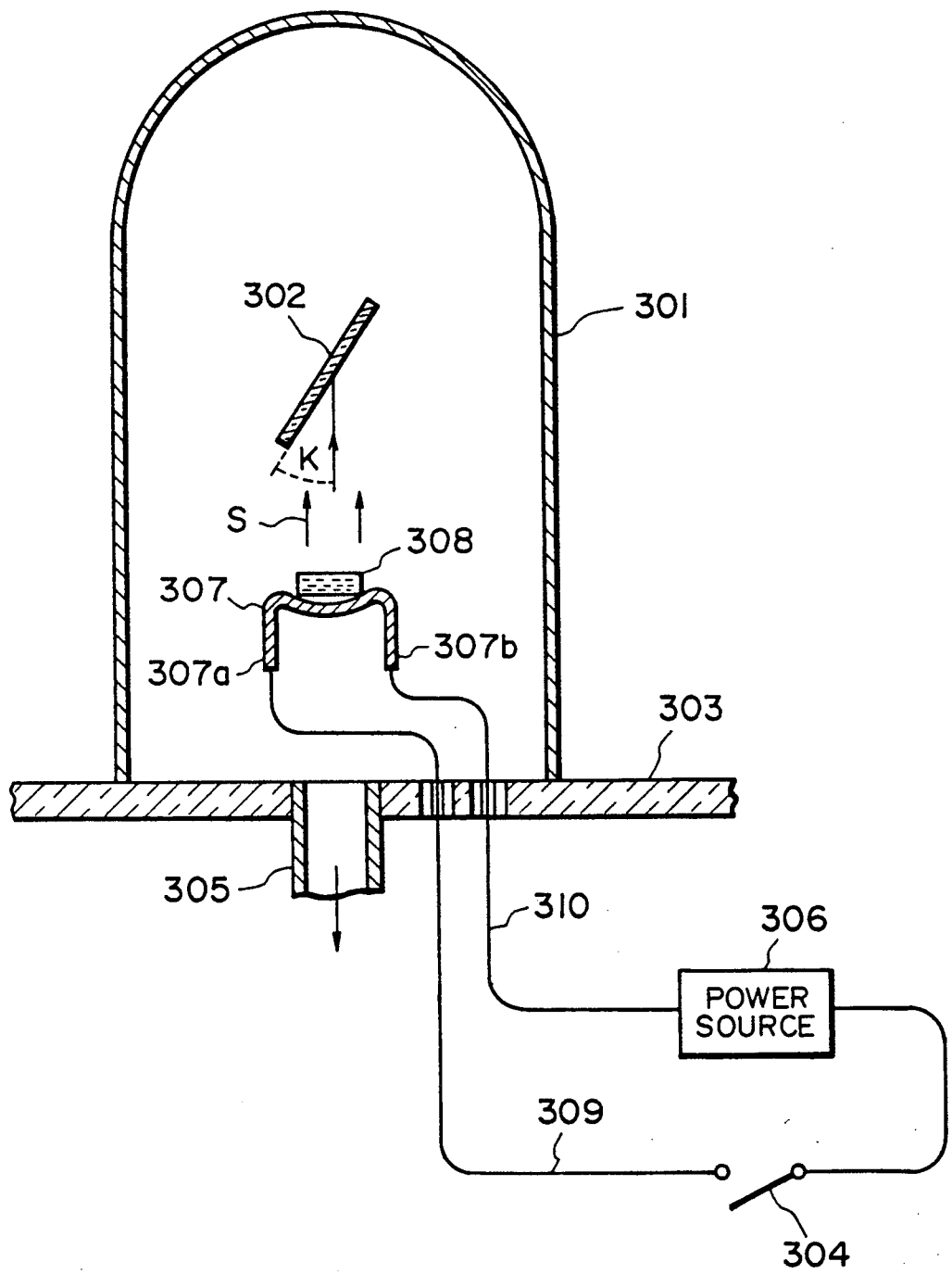
FIG. 3 is a schematic sectional view of an oblique vapor deposition apparatus used in the present invention.

In an apparatus shown in FIG. 3, a bell jar 301 is placed on an insulating substrate 303 provided with a suction hole 305 and the bell jar 301 is made vacuum by operating a vacuum pump (not shown) connected the suction hole 305. A crucible 307 made of tungsten or molybdenum is placed inside and at the bottom of the bell jar 301. In the crucible 307 is placed several grams or a crystal 308 such as SiO, $SiO_2$ or $MgF_2$. The crucible 307 has two downwardly extending arms 307a and 307b, which are respectively connected to lead wires 309 and 310. A power source 306 and a switch 304 are connected in series to the lead wires 309 and 310 outside the bell jar 301. A substrate 302 is disposed inside the bell jar 301 and right above the crucible 307 so that it forms an angle of K with respect to the vertical axis of the bell jar 301.

First, the bell jar 301 is evacuated to a vacuum of about $10^{-5}$ mmHg while the switch 304 is open. Then the switch 304 is closed to supply a power while adjusting an output of the power source 306 until the crucible is heated to an incandescent state of an appropriate temperature for evaporating the crystal 308. About 100 amps. of current is required for giving an appropriate temperature range (700°–1000° C.). The crystal 308 is then evaporated off to form an upward molecular stream denoted by S in the figure. The stream S is incident on the base plate 302 with an angle thereto of K to coat the base plate 302. The angle K is the above mentioned incident angle and the direction of the stream S is the "oblique or tilt vapor deposition direction". The thickness of the film is determined based on the calibration of the thickness with respect to the operation time which is effected prior to the introduction of the substrate 302 into the bell jar 301. After an appropriate thickness of the film is formed, a power supply from the source 306 is decreased, the switch 304 is opened, and the bell jar 301 and the interior thereof are cooled. Then, the pressure in the bell jar is raised to atmospheric pressure and the substrate 302 is taken out from the bell jar 301.

It still another embodiment, the alignment control film 105a and 105b may be formed by first forming a uniform film of the above-mentioned inorganic or organic insulating material on, i.e., in contact with or above, the substrate 101a or 101b and then subjecting the surface of the film to the oblique or tilt etching to provide the surface with an orientation controlling effect.

The alignment control films 105a and 105b may preferably be as thin as possible and may have a thickness of generally 500 Å or less, preferably 300 Å or less.

On the other hand, in the liquid crystal devices shown in FIG. 2A and 2B, the alignment control films 105a and 105b may be set to have a thickness of 200Å or more, preferably 500 Å–2000 Å because they are required to show a function of short circuit prevention.

Further, the insulating films for short circuit prevention 109a and 109b may be set to have a thickness of 200 Å or more, preferably 500 Å or more and may be composed of a film of an inorganic insulating material such as $SiO_2$, $TiO_2$, $Al_2O_3$, $Si_3N_4$ and $BaTiO_3$. The film formation may be effected by sputtering ion beam vapor deposition, or calcination of a coating film of an organic titanium compound, an organic silane compound or an organic aluminum compound. The organic titanium compound may be an alkyl (e.g., methyl, ethyl, propyl, butyl, etc.) titanate, and the organic silane compound may be an ordinary silane coupling agent. The insulating films for short circuit prevention 109a and 109b fail to show a sufficient effect of short circuit prevention if their thickness is below 200 Å. On the other hand, if the thickness is larger than 5000 Å, it becomes difficult to apply an effective voltage to the liquid crystal layer, so that the thickness may be set to 5000 Å or less, preferably 2000 Å or less.

In another preferred embodiment of the present invention, the insulating films for short circuit prevention may be composed of a material showing a large dielectric constant or a ferroelectric material. In this instance, the thickness of the alignment control films 105a and 105b may be set to 500 Å or less, preferably 10–200 Å.

More specifically, according to this embodiment, the insulating films for short circuit prevention 109a and 109b may be composed of a material having a dielectric constant of 10 or more, preferably 20 or more, as measured at a frequency of 20 KHz. Examples of such a material having a large dielectric constant or ferroelectric material may include aluminum oxide, magnesium oxide, titanium oxide, lithium oxide, bismuth oxide and organic metal compounds (e.g., titanates and niobates). The materials may be used singly or in mixture of two or more species.

In this instance, the insulating films 109a and 109b may be formed by electron beam vapor deposition or sputtering. Further, in case of an organic metal compound such as acetylacetonatotin compound, a solution of such an organic metal compound is applied by a method, such as spinner coating, dip coating, screen printing, spray coating or roller coating to form a film and calcining the film at a prescribed temperature.

The insulating films for short circuit prevention may be set to have a thickness of generally 50 Å–3000 Å, preferably 100 Å–2000 Å.

According to another embodiment of the present invention, the thickness $d_1$ of the insulating film for short circuit prevention 109a (and/or 109b), the thickness $d_2$ of the alignment control film 105a (and/or 105b), and the dielectric constants $\epsilon_1$ and $\epsilon_2$ of materials constituting the insulating film 109a (and/or 109b) and the alignment control film 105a (and/or 105b), respectively, are set to satisfy the relationships of $d_1 > d_2$ and $\epsilon_1 > \epsilon_2$.

It is further preferred that the alignment control films 105a and 105b have a thickness of 500 Å or less and are composed of materials having a dielectric constant $\epsilon_2$ of 10.0 or smaller.

The two substrates 101a and 101b are spaced from each other at a prescribed spacing by means of spacers (not shown). For example, two glass substrates 101a and 101b may be disposed to sandwich bead spacers, such as silica beads or alumina beads, having a prescribed diameter and the periphery of the two glass substrates may be sealed by a sealing agent such as an epoxy-type adhesive. Alternatively, polymer films, glass fiber, etc., may also be used as a spacer.

Between the two substrates 101a and 101b, a ferroelectric liquid crystal 103 is hermetically disposed.

The liquid crystal layer 103 in the cell structure 100 may assume SmC* (chiral smectic) phase.

A particularly preferred class of liquid crystal materials are chiral smectic liquid crystals. More specifically, liquid crystals of chiral smectic C phase (SmC*), chiral smectic G phase (SmG*), chiral smectic F phase (SmF*), chiral smectic I phase (SmI*) or chiral smectic H phase (SmH*) may be used.

Details of ferroelectric liquid crystals are described in, e.g., "LE JOURNAL DE PHYSIQUE LETTERS", 36 (L-69), 1975 "Ferroelectric Liquid Crystals", "Applied Physics Letters" 36 (11) 1980, "Submicro Second Bistable Electrooptic Switching in Liquid Crystals"; "Kotai Butsuri (Solid State Physics)" 16 (141), 1981 "Liquid Crystal", U.S. Pat. Nos. 4,561,726, 4,589,996, 4,592,858, 4,596,667, 4,613,209, 4,614,609 and 4,622,165, etc. Ferroelectric liquid crystals disclosed in these publications may be used in the present invention.

More particularly, examples of ferroelectric liquid crystal compound used in the method according to the present invention include decyloxybenzylidene-p'-amino-2-methylbutylcinnamate (DOBAMBC), hexyloxybenzylidene-p'-amino-2-chloropropylcinnamate (HOBACPC) 4-O-(2-methyl)-butylresorcylidene-4'-octylaniline (MBRA 8), etc. A particularly preferred class of ferroelectric liquid crystals are those showing cholesteric phase on the higher temperature phase which may for example include a biphenyl ester type liquid crystal showing phase transition temperatures as shown in an Example appearing hereinafter.

In a preferred embodiment of the present invention, the ferroelectric liquid crystal used may comprise a mesomorphic compound represented by the formula:

wherein $R_1$ and $R_2$ respectively denote a branched or linear chain group capable of having a substituent, $R_1$ and $R_2$ being the same or different; $A_1$ and $A_2$ respectively denote a 6-membered ring-containing divalent group capable of having a substituent; and X denotes a single bond or a divalent chain group.

Preferred examples of the groups $R_1$ and $R_2$ may include branched or linear alkyl groups capable of having a substituent, and alkoxy groups, acyl groups, acyloxy groups, alkoxycarbonyl groups and alkoxycarbonyloxy group containing a branched or linear alkyl unit capable of having a substituent.

Specific examples thereof may include: alkyl groups, such as methyl, ethyl, propyl, butyl, pentyl, hexyl, and isopropyl; acyl groups, such as acetyl, propionyl, butyryl, valeryl, palmitoyl, and 2-methylpropionyl; acyloxy groups, such as acetyloxy, propionyloxy, butyryloxy, and 2-methylpropionyloxy; alkoxy groups, such as methoxy, ethoxy, propoxy, butoxy, and 2-methylbutoxy; alkoxycarbonyl groups, such as methoxycarbonyl, ethoxycarbonyl, butoxycarbonyl, and 2-methylbutoxycarbonyl; and alkoxycarbonyloxy groups, such as methoxycarbonyloxy, ethoxycarbonyloxy, butoxycarbonyloxy, and 2-methyl-butoxycarbonyloxy.

Further preferably, at least one of $R_1$ and $R_2$ denotes an optically active chain group having an asymmetric carbon atom.

Preferred examples of such an optically active chain group having an asymmetric carbon atom for the groups $R_1$ or $R_2$ may include those represented by the following formula (2):

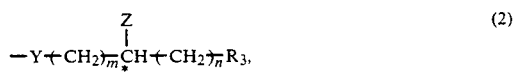

wherein Y denotes a single bond,

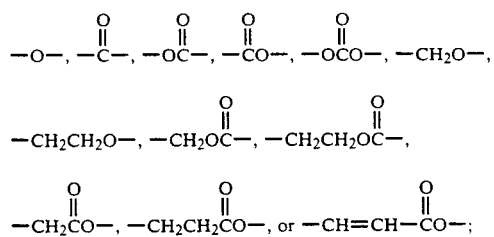

m denotes an integer of 0–8; and n denotes 0 or 1.

Further, $R_3$ in the formula (2) denotes a branched or linear alkyl group of 1–18 carbon atoms capable of having a substituent, such as methyl, ethyl, propyl, butyl or isopropyl; or an alkoxy or alkoxycarbonyl group containing a branched or linear alkyl group of 1–18 carbon atoms capable of having a substituent, such as methoxy, ethoxy, butoxy, 2-methylbutoxy, etc., or methoxycarbonyl, ethoxycarbonyl, butoxycarbonyl, 2-methylbutoxycarbonyl, etc.

Further, in the formula (2), Z denotes methyl, a halogen, cyano or trifluoromethyl group; and * denotes the location of an asymmetric carbon atom.

Examples of the substituent attachable to the groups $R_1$, $R_2$ and $R_3$ may include: a halogen atom, such as fluorine, chlorine or bromine; an alkoxy group, such as methoxy, ethoxy, propoxy or butoxy; trifluoromethyl group, and cyano group.

Next, preferred examples of the divalent 6-membered ring-containing group for the groups $A_1$ or $A_2$ in the formula (1) may include those represented by the following formula (3):

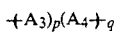    (3).

wherein p and q are respectively 0, 1 or 2; and $A_3$ and $A_4$ may preferably be respectively one of the following groups each capable of having a substituent

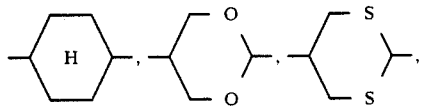

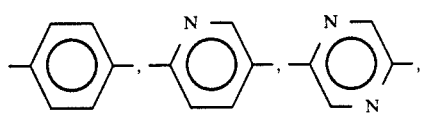

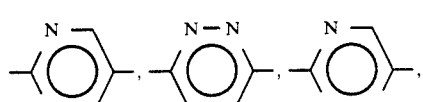

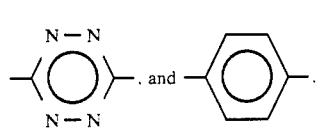

Examples of the substituent attachable to the above groups for $A_1$ and $A_2$ may include: a halogen atom, such as fluorine, chlorine or bromine; an alkyl group such as methyl, ethyl, propyl or butyl; an alkoxy group, such as methoxy, ethoxy, propoxy or butoxy; trifluoromethyl group, and cyano group.

X in the formula (1) denotes a single bond or a divalent chain group, and may preferably selected from the following: a single bond, —O—, —S—,

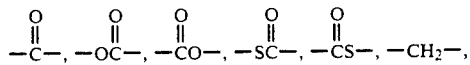

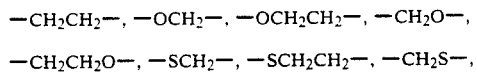

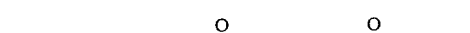

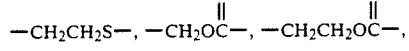

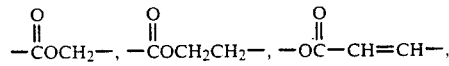

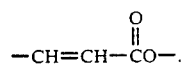

Representative compounds expressed by the general formula (1) are enumerated below.

Example Compound No.

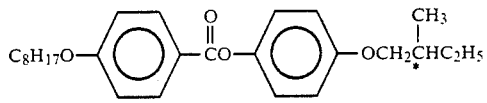  (1)

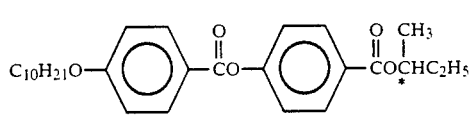  (2)

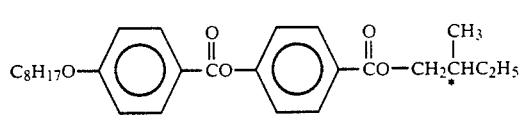  (3)

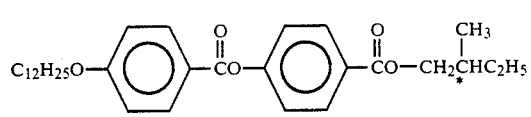  (4)

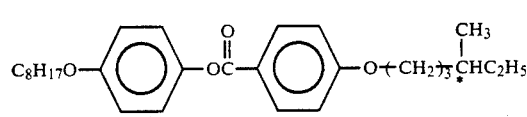  (5)

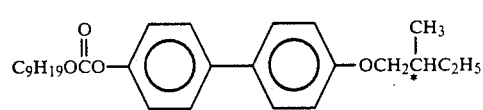  (6)

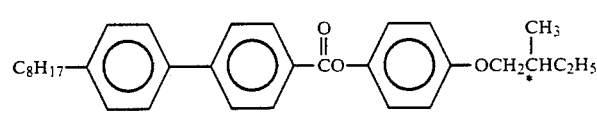  (7)

-continued
Example Compound No.
 (8)
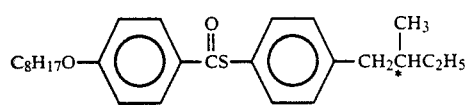 (9)
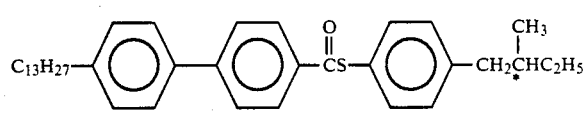 (10)
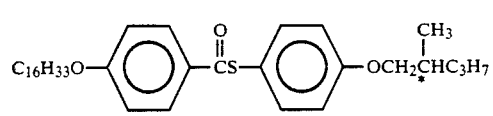 (11)
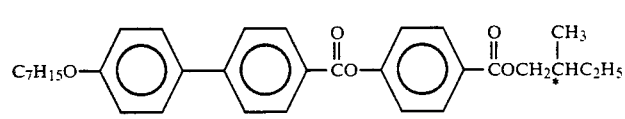 (12)
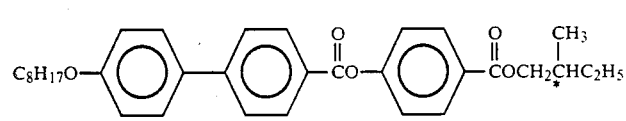 (13)
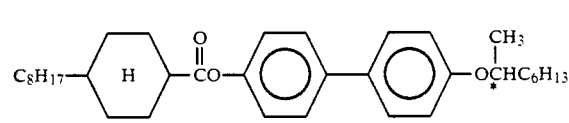 (14)
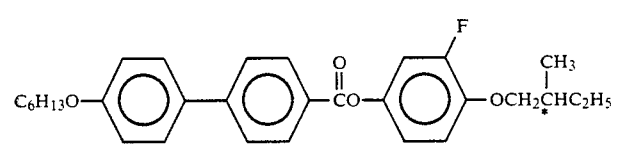 (15)
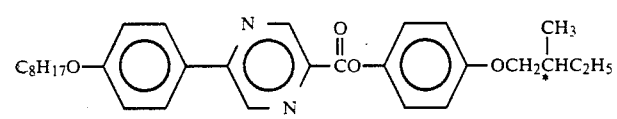 (16)
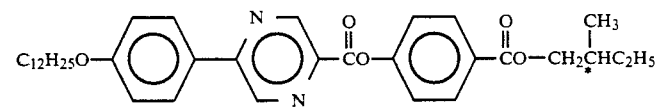 (17)
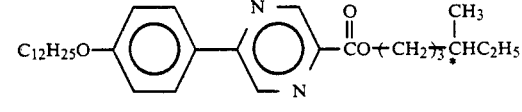 (18)
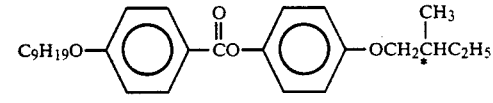 (19)
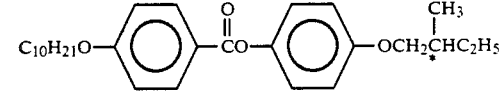 (20)

-continued
Example Compound No.
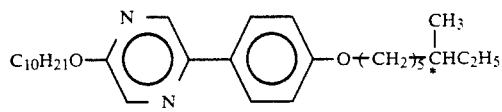 (21)
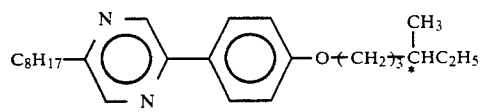 (22)
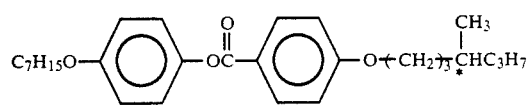 (23)
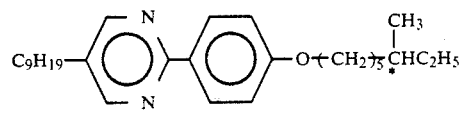 (24)
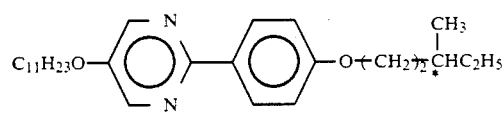 (25)
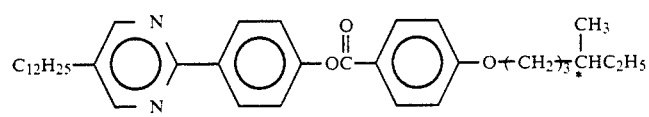 (26)
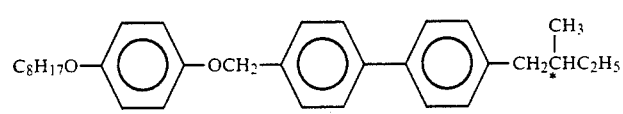 (27)
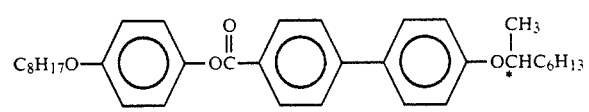 (28)
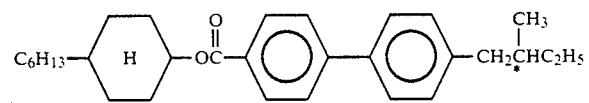 (29)
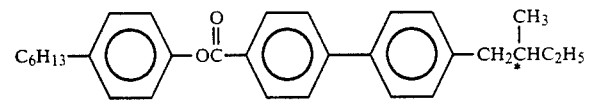 (30)
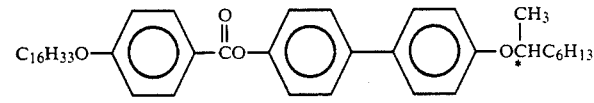 (31)
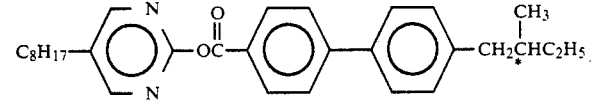 (32)
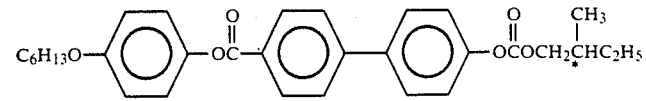 (33)

-continued
Example Compound No.
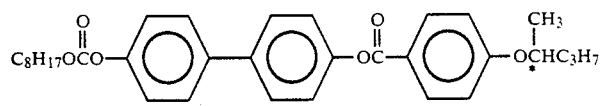 (34)
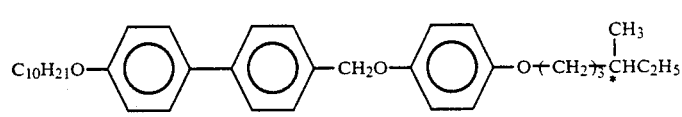 (35)
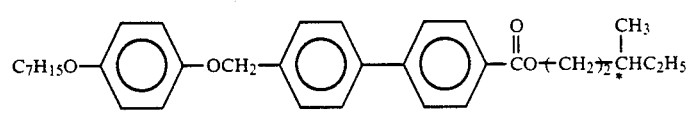 (36)
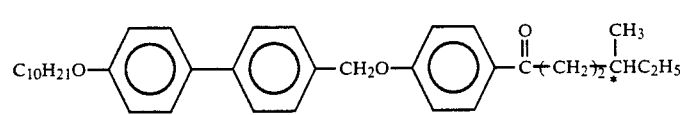 (37)
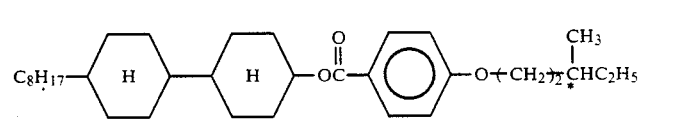 (38)
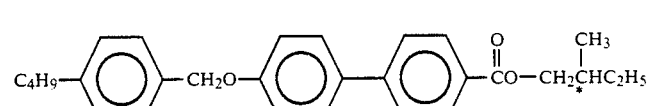 (39)
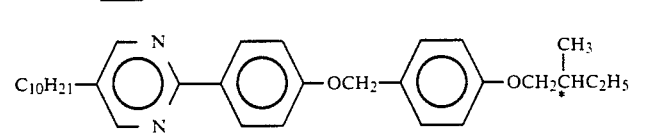 (40)
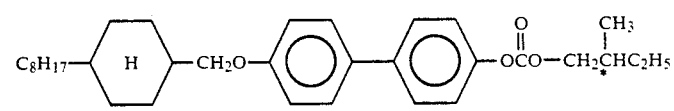 (41)
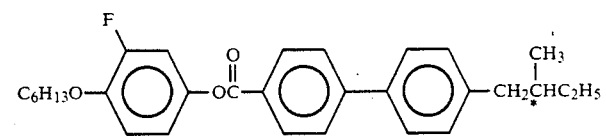 (42)
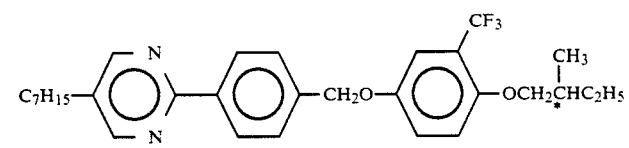 (43)
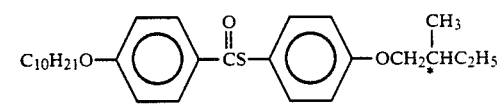 (44)
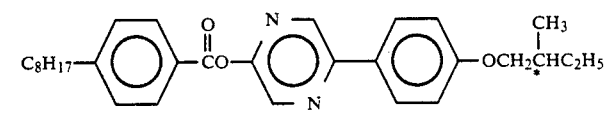 (45)
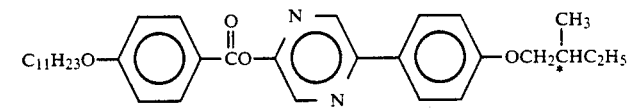 (46)

-continued
Example Compound No.
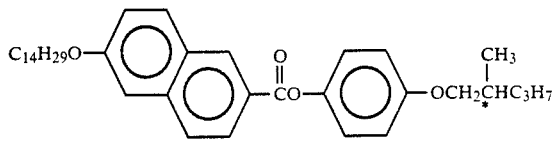 (47)
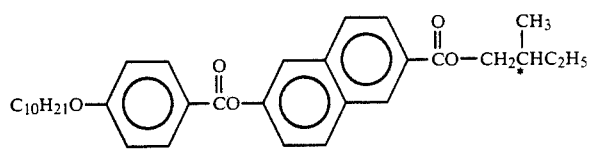 (48)
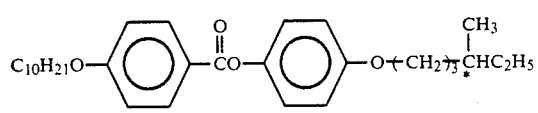 (49)
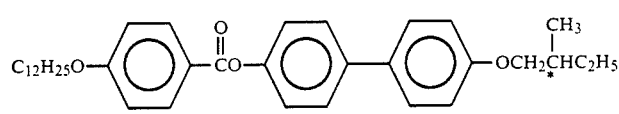 (50)
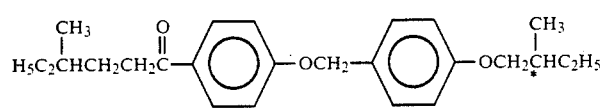 (51)
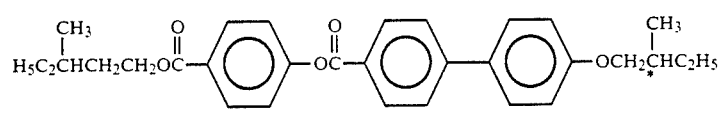 (52)
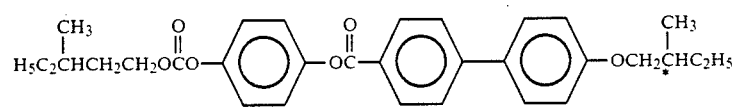 (53)
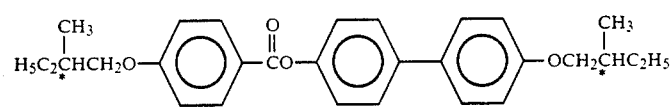 (54)
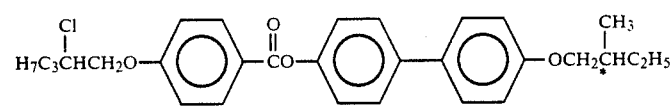 (55)
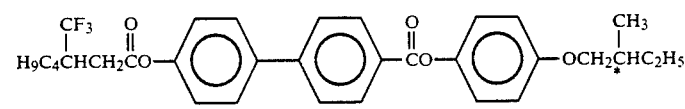 (56)
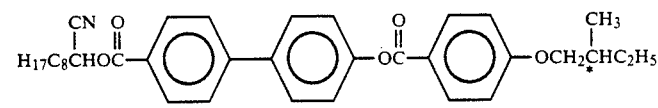 (57)
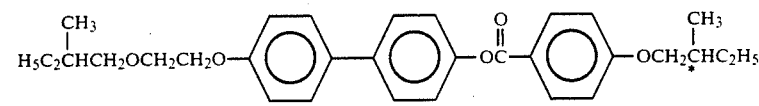 (58)

-continued
Example Compound No.
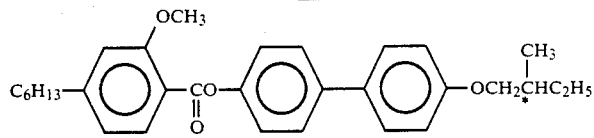
(59)
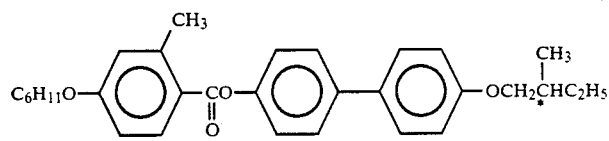
(60)
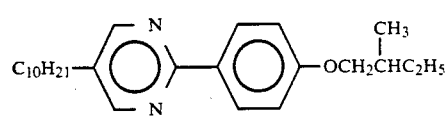
(61)
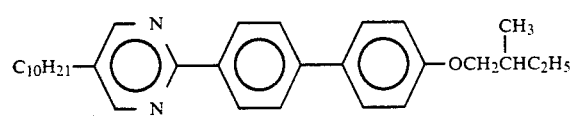
(62)
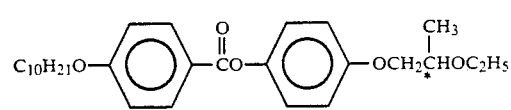
(63)
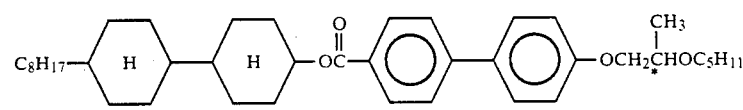
(64)
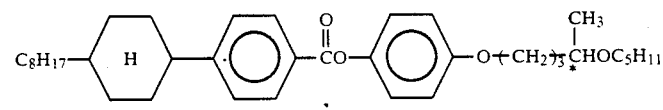
(65)
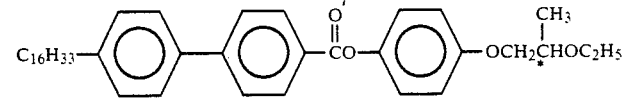
(66)
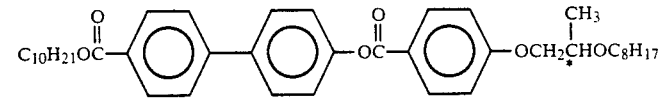
(67)
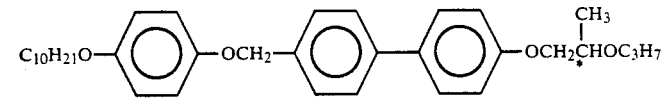
(68)
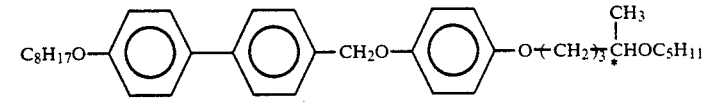
(69)
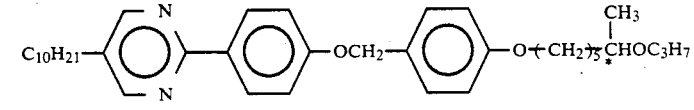
(70)
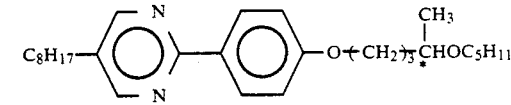
(71)

-continued
Example Compound No.
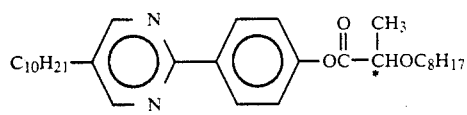 (72)
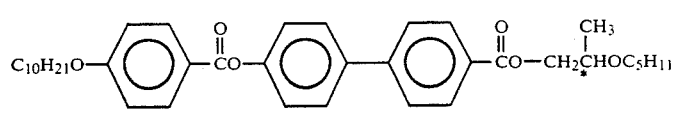 (73)
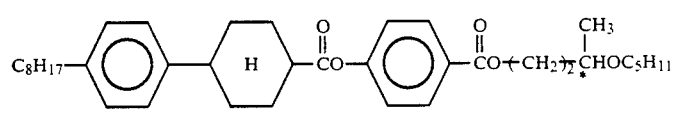 (74)
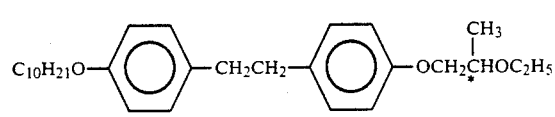 (75)
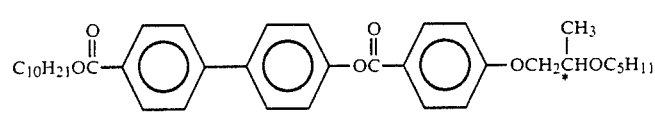 (76)
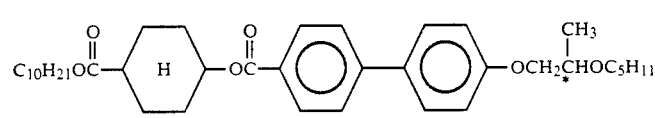 (77)
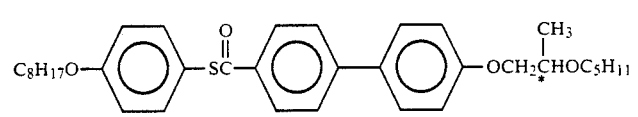 (78)
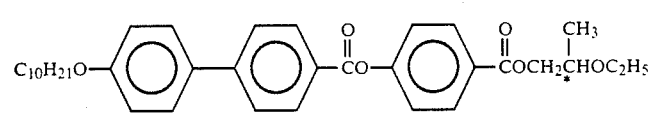 (79)
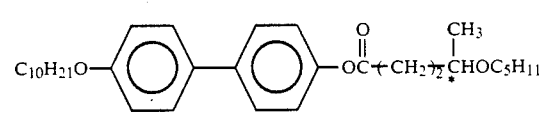 (80)
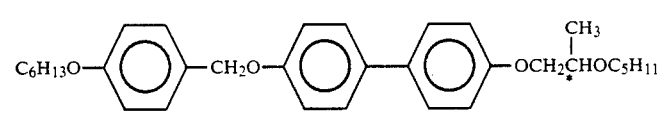 (81)
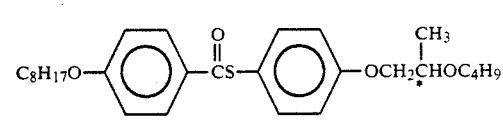 (82)
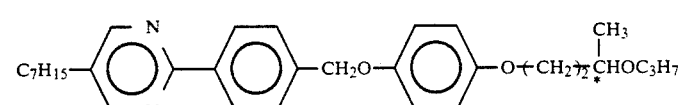 (83)
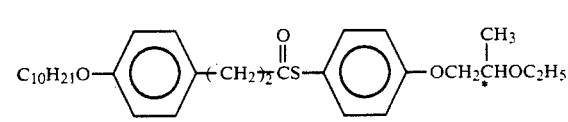 (84)

-continued
Example Compound No.
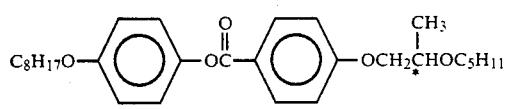 (85)
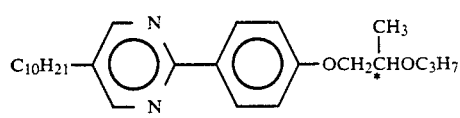 (86)
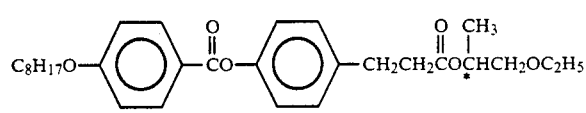 (87)
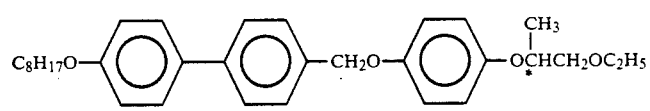 (88)
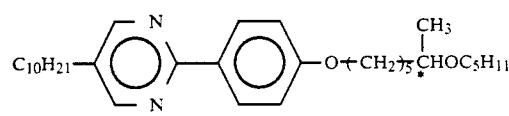 (89)
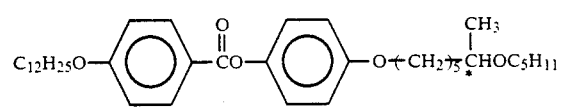 (90)
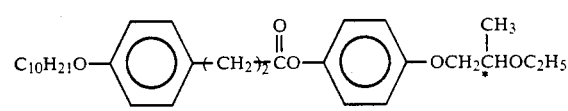 (91)
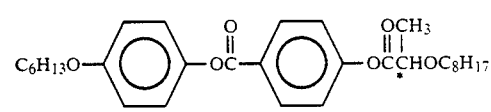 (92)
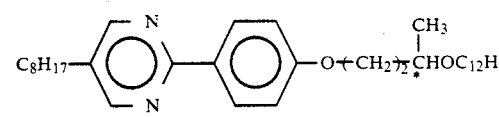 (93)
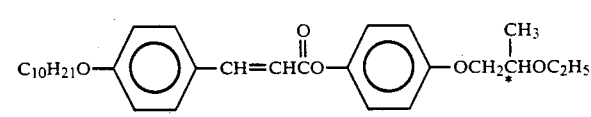 (94)
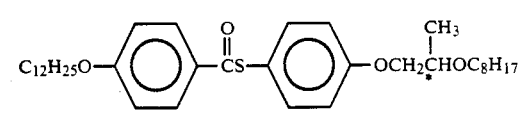 (95)
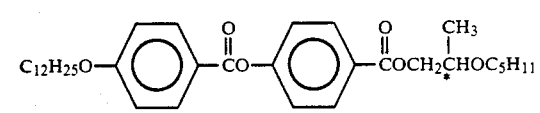 (96)
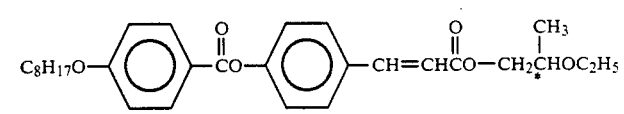 (97)

-continued
Example Compound No.
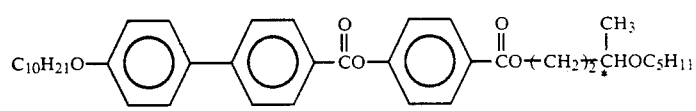 (98)
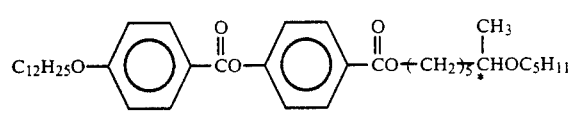 (99)
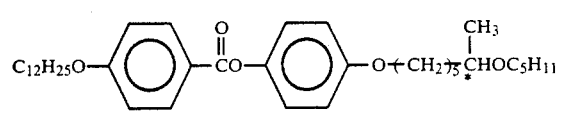 (100)
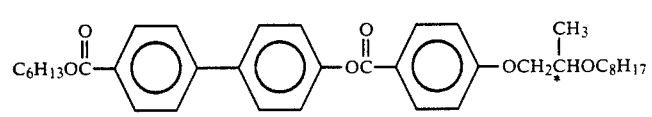 (101)
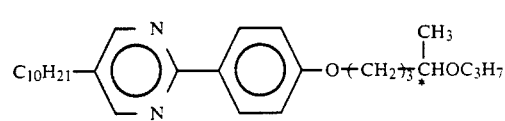 (102)
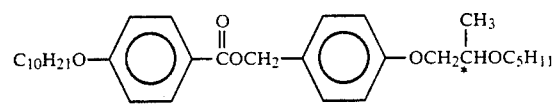 (103)
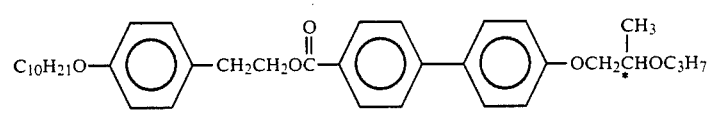 (104)
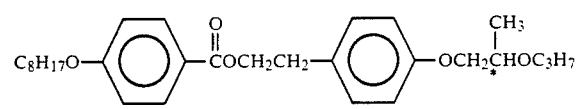 (105)
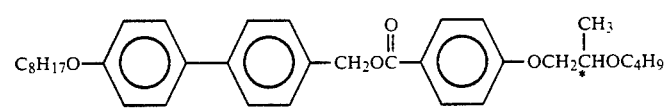 (106)
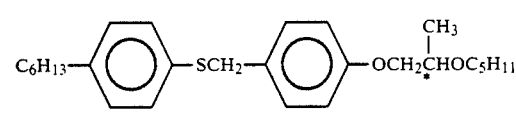 (107)
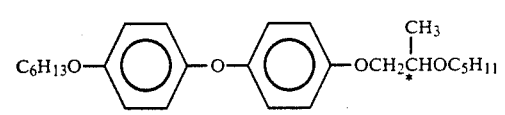 (108)
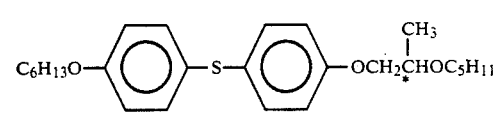 (109)
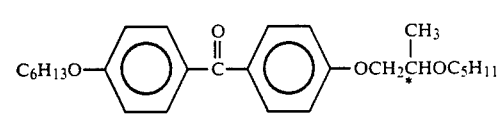 (110)

-continued
Example Compound No.
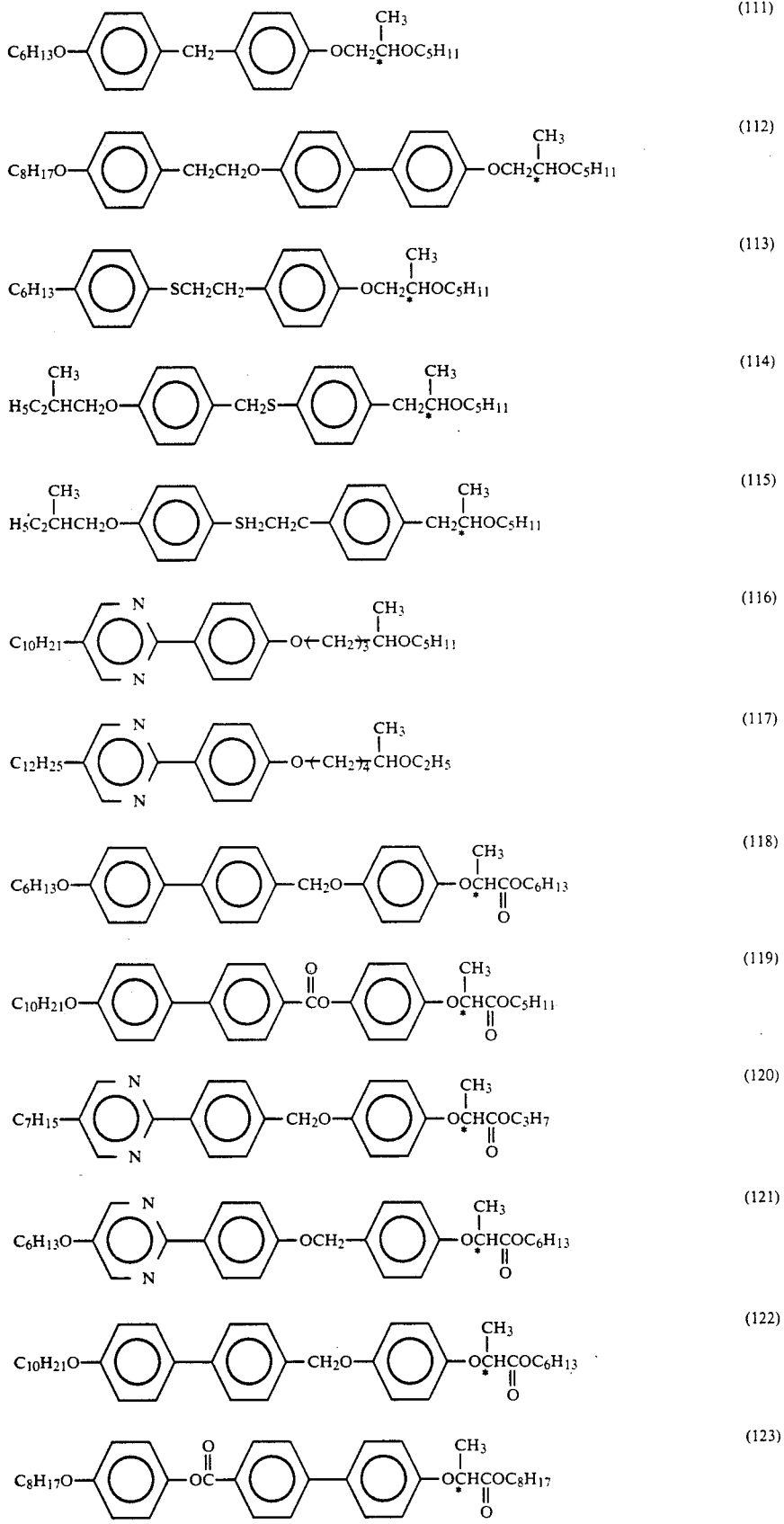

-continued
Example Compound No.
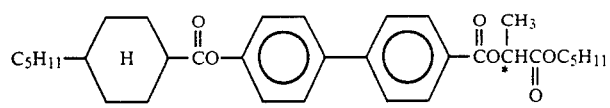 (124)
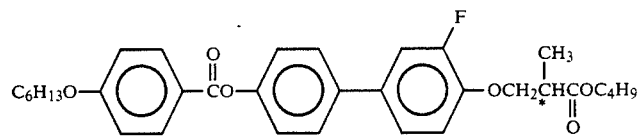 (125)
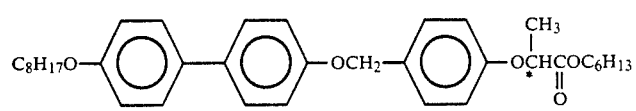 (126)
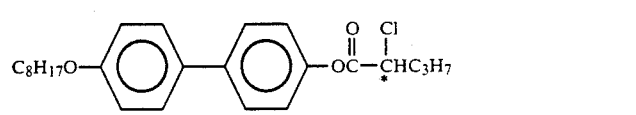 (127)
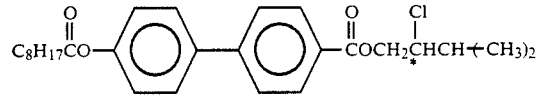 (128)
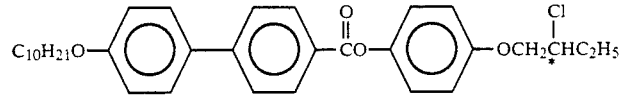 (129)
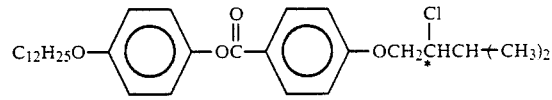 (130)
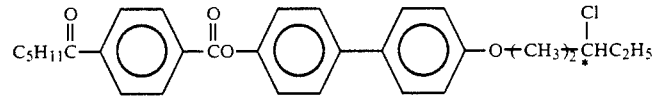 (131)
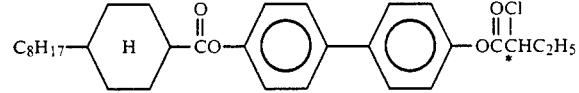 (132)
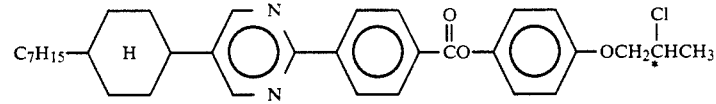 (133)
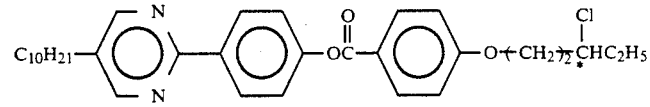 (134)
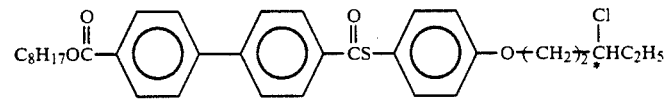 (135)
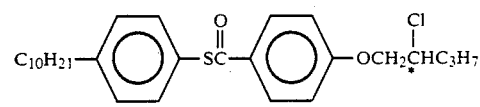 (136)

-continued
Example Compound No.
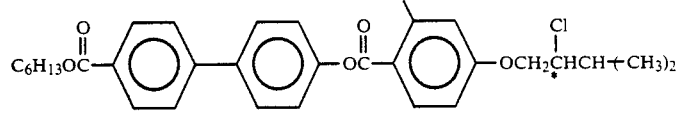 (137)
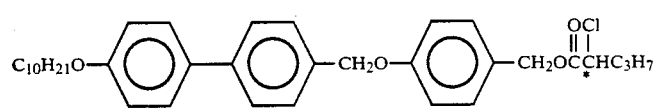 (138)
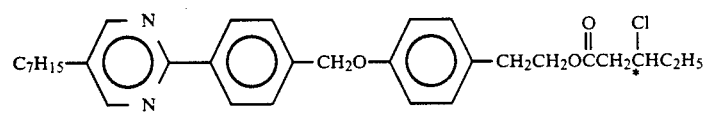 (139)
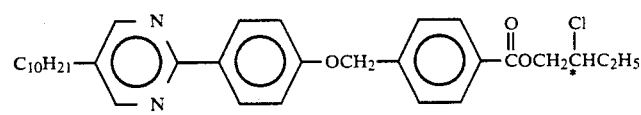 (140)
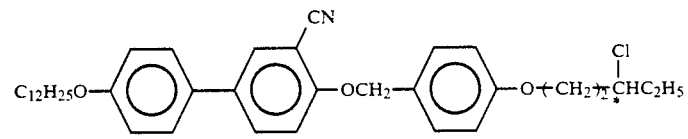 (141)
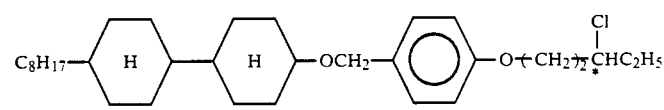 (142)
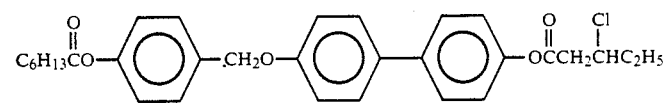 (143)
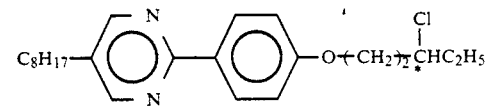 (144)
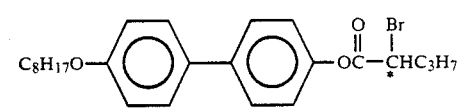 (145)
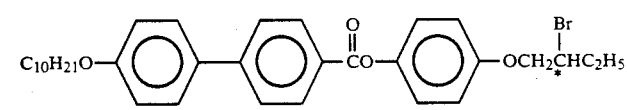 (146)
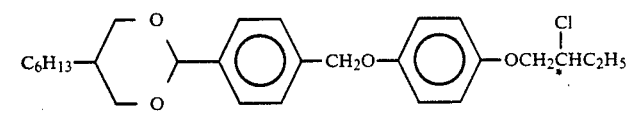 (147)
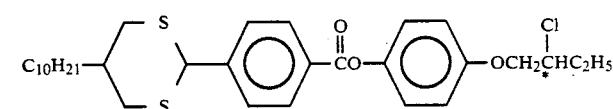 (148)
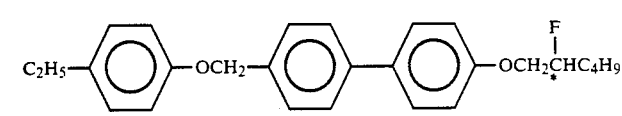 (149)

-continued
Example Compound No.
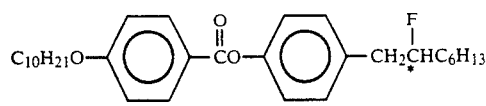 (150)
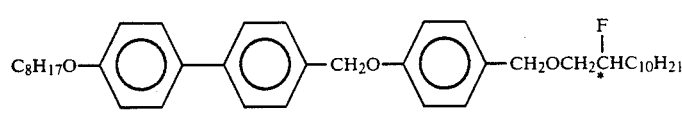 (151)
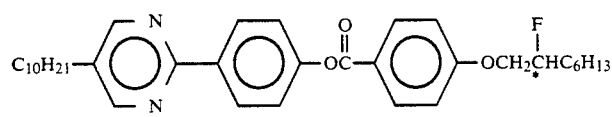 (152)
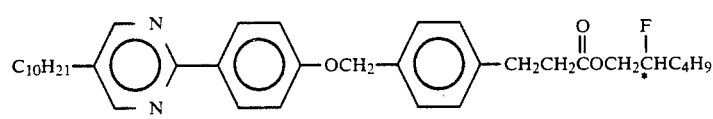 (153)
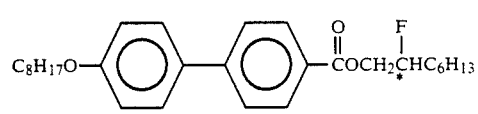 (154)
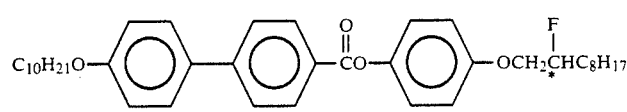 (155)
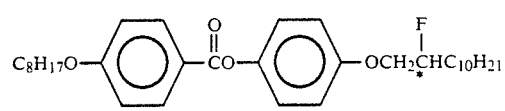 (156)
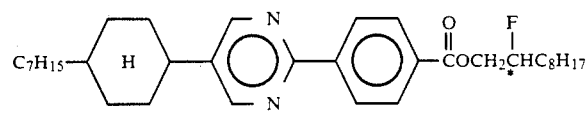 (157)
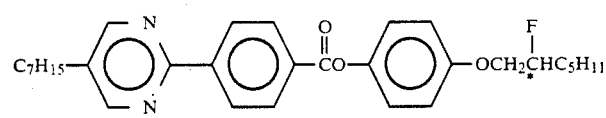 (158)
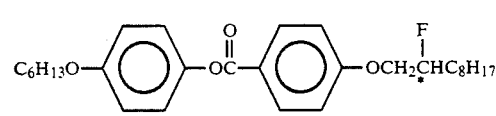 (159)
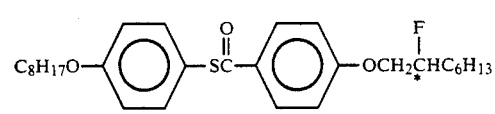 (160)
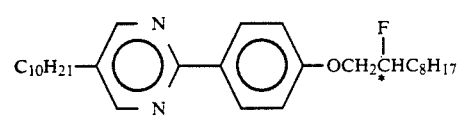 (161)
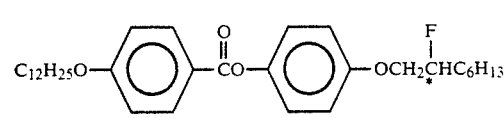 (162)

-continued
Example Compound No.
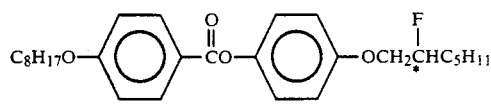 (163)
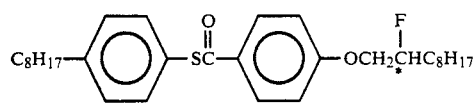 (164)
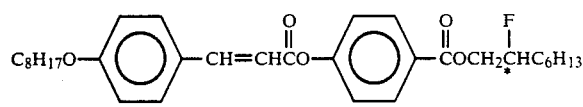 (165)
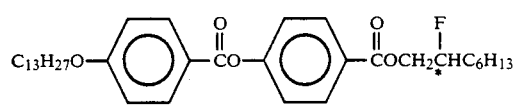 (166)
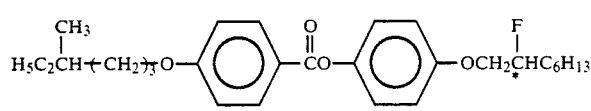 (167)
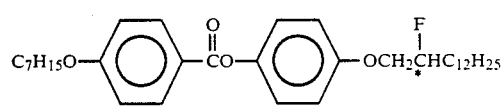 (168)
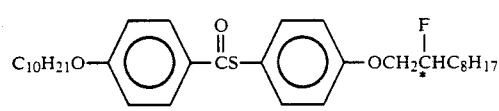 (169)
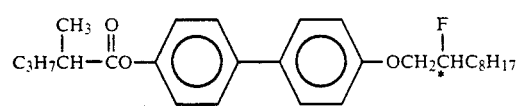 (170)
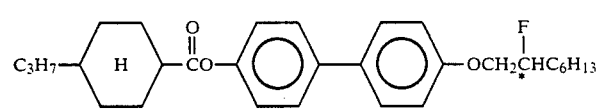 (171)
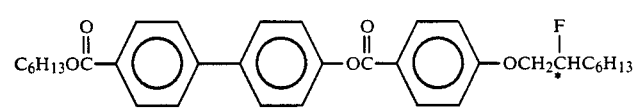 (172)
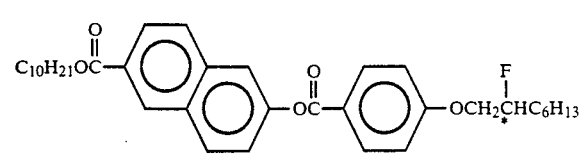 (173)
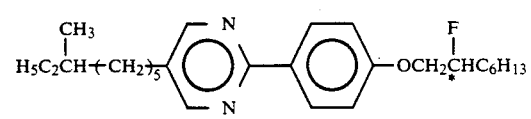 (174)
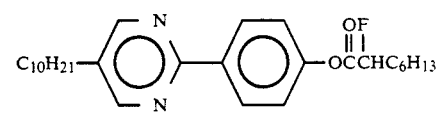 (175)

-continued
Example Compound No.
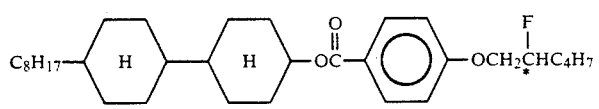 (176)
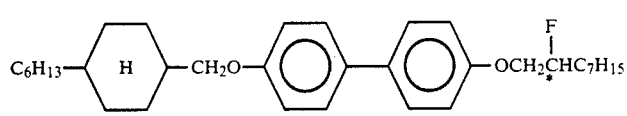 (177)
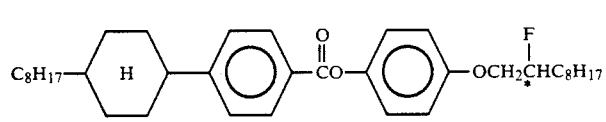 (178)
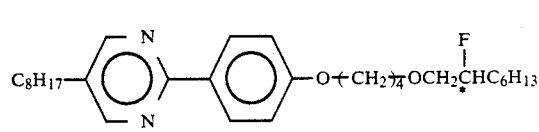 (179)
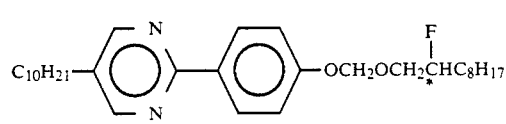 (180)
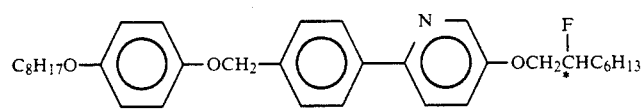 (181)
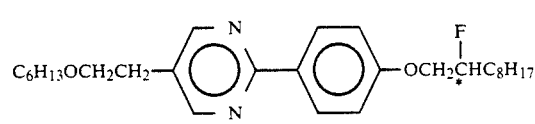 (182)
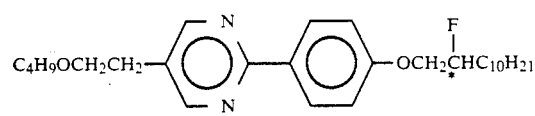 (183)
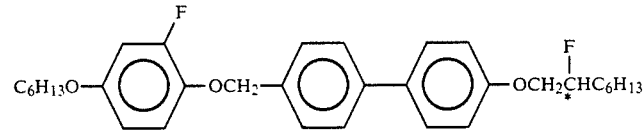 (184)
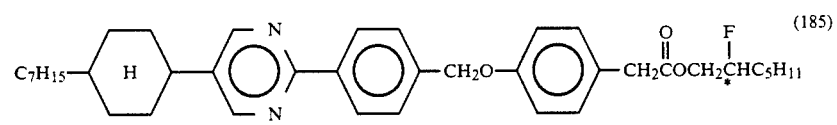 (185)
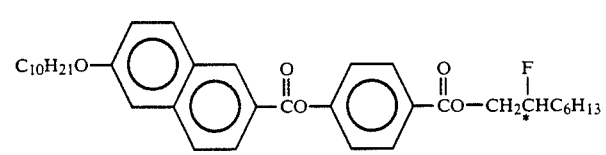 (186)
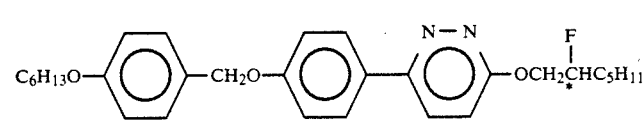 (187)
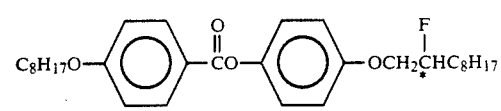 (188)

-continued
Example Compound No.
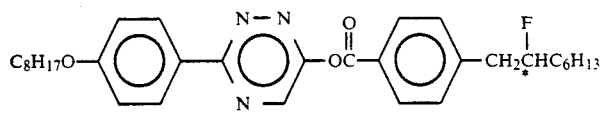 (189)
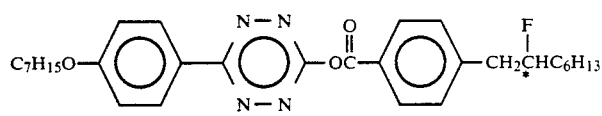 (190)
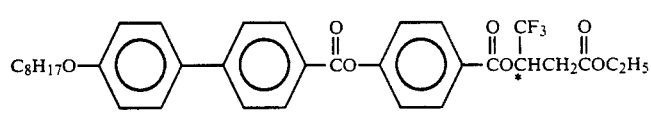 (191)
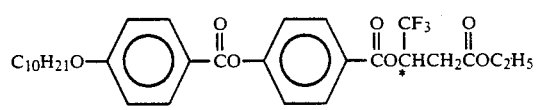 (192)
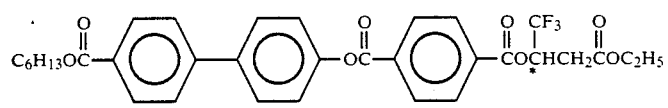 (193)
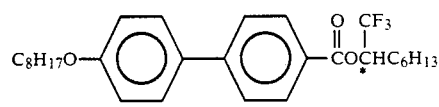 (194)
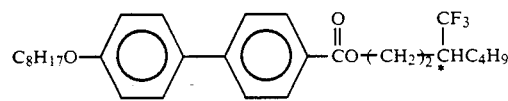 (195)
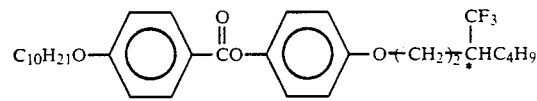 (196)
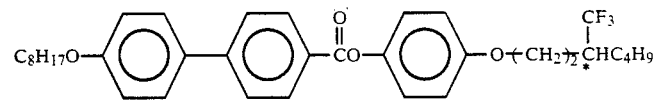 (197)
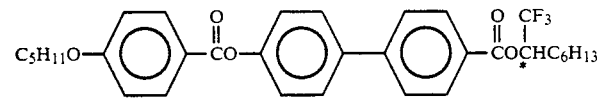 (198)
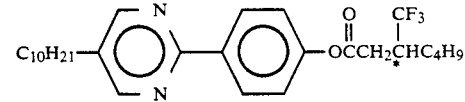 (199)
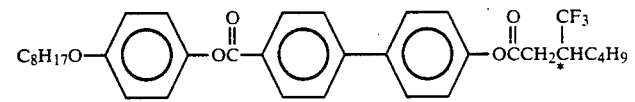 (200)
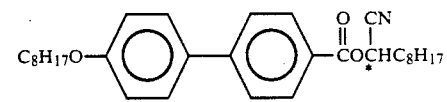 (201)

-continued

Example Compound No.

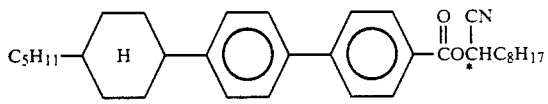 (202)

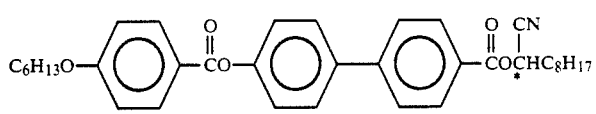 (203)

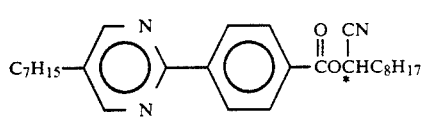 (204)

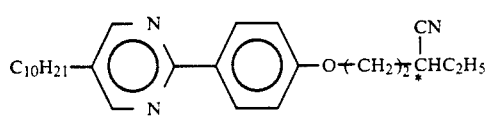 (205)

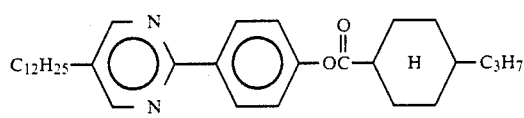 (206)

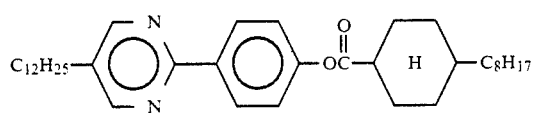 (207)

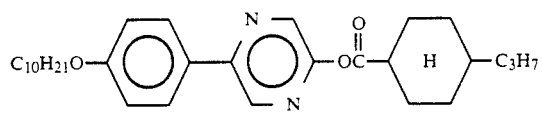 (208)

Hereinbelow, some examples of synthesis of mesomorphic compounds represented by the formula (1) are described hereinbelow.

SYNTHESIS EXAMPLE 1

Synthesis of the above Example Compound No. (1)

2.0 g (8 mmol) of the following carboxylic acid

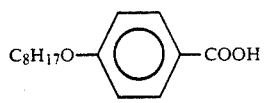

was charged in a 30 ml-round-bottomed flask, and 7 ml of thionyl chloride was added thereto under cooling. Then, the mixture was allowed to rise in temperature to room temperature, and after attachment of a cooling pipe, was subjected to 4 hours of heat refluxing on an external bath of 70°–80° C. After the reaction, excessive thionyl chloride was distilled off to obtain an acid chloride. The acid chloride was dissolved in 15 ml of toluene and the solution was added to a solution of 1.44 g (8 mmol) of the following phenol derivative.

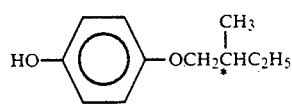

dissolved in pyridine cooled at 0°–5° C. Thereafter, the mixture was continually stirred for about 2 hours at 0°–5° C. and then stirred for 16 hours at room temperature. After completion of the reaction, the mixture was poured into about 200 ml of iced water, followed by extraction with benzene, three times of washing with 5% hydrochloric acid aqueous solution, one time of washing with ion-exchanged water, and after neutralization with 5% $K_2CO_3$ aqueous solution, one time of further washing with ion-exchanged water.

The organic layer was taken out and dried with anhydrous magnesium, followed by distilling-off of the solvent to obtain a crude product. The product was purified by silica gel column chromatography by using benzene as the developer.

A crystal obtained after removal of the solvent by distillation was re-crystallized from n-hexane to obtain an objective product. The product was further dried under vacuum at room temperature to obtain 0.95 g of a final objective product. The yield was 28.7%.

SYNTHESIS EXAMPLE 2

Synthesis of Example Compound No. (69)

2.1 g (6.73 mmol) of the following alcohol derivative

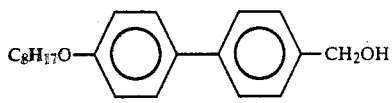

was charged in a 30 ml-round-bottomed flask, and 6 ml of thionyl chloride was added under cooling. Then, the mixture was allowed to rise to room temperature, and after attachment of a cooling pipe, the mixture was refluxed under heating for 4 hours on an external bath at 70°-80° C. After the reaction, excessive thionyl chloride was distilled off to obtain an acid chloride, which was then dissolved in 15 ml of toluene.

Separately, 0.5 g of 60% sodium hydride in oil was placed in a 200 ml-three-necked flask and washed several times with dry n-hexane. Then, 1.79 g (6.73 mmol) of the following phenol derivative

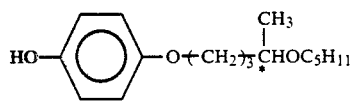

dissolved in 15 ml of THF (tetrahydrofuran) was added dropwise at room temperature, and 20 ml of DMSO (dimethyl sulfoxide) was added, followed by 1 hour of stirring. Further, thereto, the above-prepared toluene solution of the acid chloride was gradually added dropwise, and after the addition, the mixture was further stirred for 16 hours at room temperature.

After the reaction, the mixture was poured into about 200 ml of iced water, followed by separation of the organic layer and two times of extraction of the aqueous layer with 50 ml of benzene.

The organic layer and the benzene extract was mixed together and then subjected to two times of washing with 5% hydrochloric acid aqueous solution, one time of washing with ion-exchanged water, one time of washing with 5% NaOH aqueous solution, and washing with ion-exchanged water until the organic layer showed a neutral pH.

The organic layer was taken out and dried on anhydrous magnesium sulfate, followed by distilling-off of solvent to obtain a crude product, which was then purified by silica gel column chromatography by using a developer mixture of n-hexane/dichloromethane=3/10.

The solvent was removed by distillation to obtain a crystal, which was then re-crystallized from n-hexane and dried under vacuum at room temperature to obtain 0.74 g of a final purified objective product. The yield was 19.7%.

SYNTHESIS EXAMPLE 3

Synthesis of Example Compound (78)

2.2 g (6.43 mmol) of the following carboxylic acid

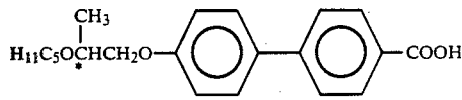

was charged in a 30 ml-round-bottomed flask and 6 ml of thionyl chloride was added thereto under cooling. Then, the mixture was allowed to rise to room temperature, and after attachment of a cooling pipe, was subjected to 4 hours of heat refluxing on an external bath of 70°-80° C. After the reaction, excessive thionyl chloride was distilled off to obtain an acid chloride, the acid chloride was dissolved in 15 ml of toluene, and the solution was added to a solution of 1.53 g (6.43 mmol) of the following thiophenyl derivative

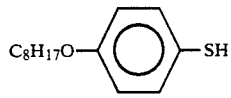

dissolved in pyridine cooled at 0°-5° C. Thereafter, the mixture was continually stirred for about 2 hours at 0°-5° C. and then stirred for 16 hours at room temperature. After completion of the reaction, the mixture was poured into about 200 ml of iced water, followed by extraction with benzene, three times of washing with 5% hydrochloric acid aqueous solution, one time of washing with ion-exchanged water, and after neutralization with 5% $K_2CO_3$ aqueous solution, one time of further washing with ion-exchanged water.

The organic layer was taken out and dried with anhydrous magnesium, followed by distilling-off of the solvent to obtain a crude product. The product was purified by silica gel column chromatography by using benzene as the developer.

A crystal obtained after removal of the solvent by distillation was re-crystallized from n-hexane and further dried under vacuum at room temperature to obtain 1.06 g of a final objective product. The yield was 29.3%.

SYNTHESIS EXAMPLE 4

Synthesis of Example Compound No. (108)

3.5 g (24.0 mmol) of the following alcohol derivative

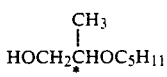

and 10 ml of pyridine were charged in a 50 ml-round-bottomed flask, and 5.5 g (28.8 mmol) of p-toluenesulfonic acid chloride was added little by little in 30 minutes under cooling. Then, the mixture was stirred for 4 hours at 20° C. or below.

The mixture was poured into 200 ml of iced water and acidified with 6N-hydrochloric acid aqueous solution, followed by three times of extraction with 80 ml of isopropyl ether. The extracted organic layer was washed 4 times with ion-exchanged water, dried on anhydrous magnesium sulfate and removal of the solvent by distillation to obtain a crude product, which was then purified by silica gel column chromatography with benzene as the developer to obtain 6.13 g of an intermediate tosylate.

Separately, 4.0 g (14.0 mmol) of the following phenol derivative

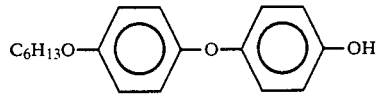

and 70 mol of butanol were charged in a 200 ml-three-necked flask, and 1.6 g of potassium hydroxide was added thereto, followed by 1 hour of stirring for 1 hour and stirring at 50°-60° C. for further 2 hours.

To this mixture, a solution of 4.2 g (14.0 mmol) of the above-prepared intermediate tosylate in 15 ml of butanol was gradually added, and the mixture was stirred for about 1 hour. Then, after attachment of a cooling pipe, the mixture was heat-refluxed for 6 hours. After the reaction, the reaction liquid was poured into 250 ml of iced water, followed by addition of 6N-hydrochloric acid solution to provide a pH value of 1-2.

The mixture was extracted three times with 80 ml of isopropyl ether. Then, the organic layer was washed with ion-exchanged water until the aqueous phase shows a neutral pH. Then, the organic layer was taken out and dried on anhydrous magnesium sulfate, followed by removal of the solvent by distillation to obtain a crude objective product.

Then, the crude product was purified by silica gel column chromatography with benzene as the developer, followed by removal of the developer by distillation, re-crystallization from n-hexane and drying under vacuum at room temperature to obtain 0.65 g of a purified objective product. The yield was 11.3%.

SYNTHESIS EXAMPLE 5

Synthesis of Example Compound (161)

2.5 g (14.2 mmol) of the following alcohol derivative

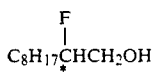

and 15 ml of pyridine in a 50 ml-round-bottomed flask, and 3.23 g (16.9 mmol) of p-toluenesulfonic acid chloride was added little by little in 30 minutes under cooling. Then, the mixture was stirred for 4 hours at 20° C. or below.

The mixture was poured into 200 ml of iced water and acidified with 6N-hydrochloric acid aqueous solution, followed by three times of extraction with 80 ml of isopropyl ether. The extracted organic layer was washed 4 times with ion-exchanged water, dried on anhydrous magnesium sulfate and removal of the solvent by distillation to obtain a crude product, which was then purified by silica gel column chromatography with benzene as the developer to obtain 4.5 g of an intermediate tosylate.

Separately, 3.5 g (11.2 mmol) of the following phenol derivative

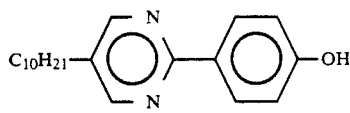

and 30 ml of DMF (dimethylformamide) were charged in a 200 ml-three-necked flask, and 1.0 g of potassium hydroxide was added thereto, followed by 1 hour of stirring for 1 hour and stirring at 90°-95° C. for further 2 hours.

To this mixture, a solution of 4.0 g (12.1 mmol) of the above-prepared intermediate tosylate in 10 ml of DMF was gradually added, and the mixture was stirred for about 1 hour. Then, after attachment of a cooling pipe, the mixture was heat-refluxed for 6 hours. After the reaction, the reaction liquid was poured into 250 ml of iced water, followed by addition of 6N-hydrochloric acid solution to provide a pH value of 1-2.

The mixture was extracted three times with 80 ml of benzene. Then, the organic layer was washed with ion-exchanged water until the aqueous phase shows a neutral pH. Then, the organic layer was taken out and dried on anhydrous magnesium sulfate, followed by removal of the solvent by distillation to obtain a crude objective product.

Then, the crude product was purified by silica gel column chromatography with benzene as the developer, followed by removal of the developer by distillation, re-crystallization from ethanol and drying under vacuum at room temperature to obtain 2.4 g of a purified objective product. The yield was 45.5%.

In addition to the compounds specifically described above with respect to their production methods, other compounds may also be prepared easily in general according to a process wherein a carboxylic acid derivative is converted into an acid chloride in a known manner, which is then reacted with a corresponding compound such as an alcohol or thiol; or an alcohol derivative is converted into a halogenate or tosylate, which is then reacted with a corresponding alcohol derivative in the presence of an alkali.

The ferroelectric liquid crystal layer in the ferroelectric liquid crystal device of the present invention may be formed by preparing a ferroelectric liquid crystal composition by mixing at least one species of mesomorphic compound as represented by the general formula (I) in appropriate proportions, hermetically injecting the ferroelectric liquid crystal composition heated to isotropic phase in a device cell under vacuum, gradually cooling the cell to form a liquid crystal layer, and then system is restored to a normal pressure.

In the above ferroelectric liquid crystal composition, each mesomorphic compound may desirably be contained in a proportion of 1-99%.

When a device is constituted by using these materials, the device may be supported with a block of copper, etc., in which a heater is embedded in order to realize a temperature condition where the liquid crystal composition assumes a desired chiral smectic phase.

Figure 4:
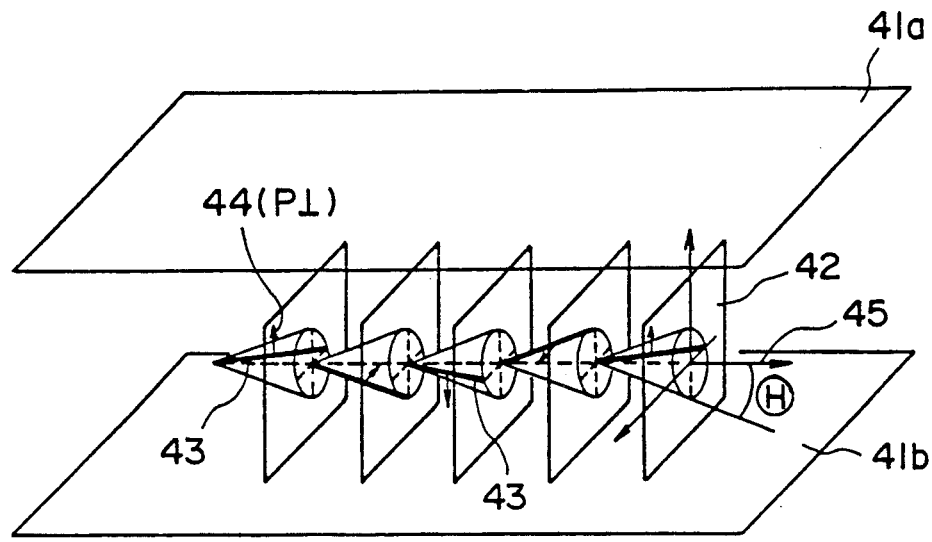
FIG. 4 is a schematic perspective view showing molecular orientation states of a ferroelectric liquid crystal having a helical structure.

Referring to FIG. 4, there is schematically shown an example of a ferroelectric liquid crystal cell for explanation of the operation thereof, in which a ferroelectric liquid crystal assumes, e.g., SmC* phase as a desired phase. Reference numerals 41a and 41b denote substrates (glass plates) on which a transparent electrode of, e.g., In$_2$O$_3$, SnO$_2$, ITO (Indium-Tin Oxide), etc., is disposed respectively. A liquid crystal of SmC* phase in which liquid crystal molecular layers 42 are oriented perpendicular to surfaces of the glass plates is hermetically disposed therebetween. A full line 43 shows a liquid crystal molecule, and the liquid crystal molecules 43 form a helical structure continuously in the direction of a substrate surface extension. A liquid crystal molecule 43 forms a tilt angle (H) with respect to the central axis 45 of the helical structure. Each liquid crystal molecule 43 has a dipole moment (P⊥) 44 in a direction perpendicular to the axis thereof. When a voltage higher than a certain threshold level is applied between electrodes formed on the substrates 41a and 41b, a helical structure of the liquid crystal molecule 43 is unwound to change the alignment direction of respective liquid crystal molecules 43 so that the dipole moments (P⊥) 44 are all directed in the direction of the electric field. The liquid crystal molecules 43 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 5:
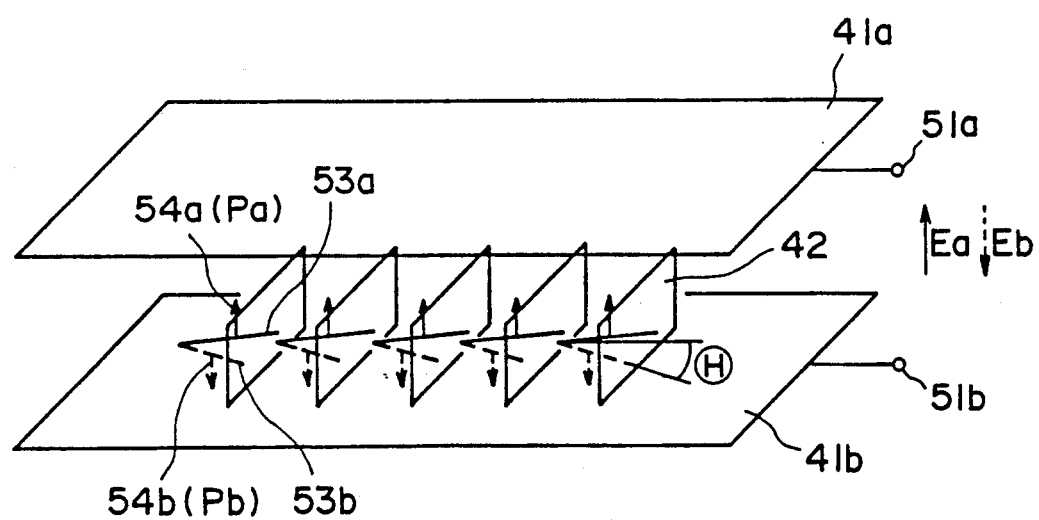
FIG. 5 is a schematic perspective view showing molecular orientation states of a ferroelectric liquid crystal of a non-helical structure (disposed in a layer thin enough to release the helical structure intrinsic to a chiral smectic liquid crystal in the absence of an electric field)

The liquid crystal layer in the liquid crystal device of the present invention may be rendered sufficiently thin in thickness (e.g., less than 10μ). As the thickness of the liquid crystal layer is decreased, the helical structure of the liquid crystal molecules is unwound or released even in the absence of an electric field whereby the dipole moment assumes either of the two states, i.e., Pa in an upper direction 54a or Pb in a lower direction 54b as shown in FIG. 5. A half of the angle formed between the molecular axes 53a and 53b formed at this time is referred to as a tilt angle (Ĥ) which is equal to the tilt angle Ĥ, a half of the apical angle of the helical cone, in the helical structure described above. When an electric field Ea or Eb higher than a certain threshold level and different from each other in polarity as shown in FIG. 5 is applied to a cell having the above-mentioned characteristics, the dipole moment is directed either in the upper direction 54a or in the lower direction 54b depending on the ventor of the electric field Ea or Eb. In correspondence with this, the liquid crystal molecules are oriented to either a first stable state 53a or a second stable state 53b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 5. When the electric field Ea is applied to the liquid crystal molecules, they are oriented to the first stable state 53a. This state is kept stable even if the electric field is removed. On the other hand, when the electric field Eb of which direction is opposite to that of the electric field Ea is applied thereto, the liquid crystal molecules are oriented to the second stable state 53b, whereby the directions of molecules are changed. This state is similarly kept stable even if the electric field is removed. In order to effectively realize high response speed and bistability, it is preferable that the thickness of the cell is as thin as possible.

Figure 6:
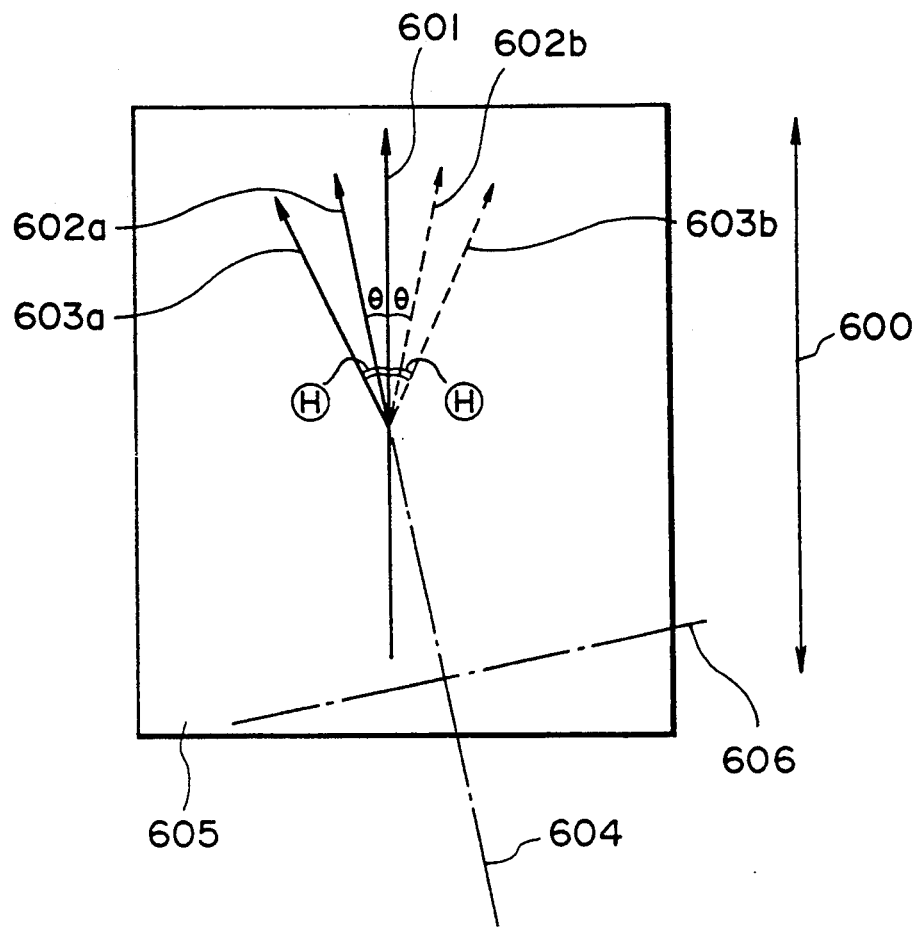
FIG. 6 is a schematic plan view showing molecular orientation states of a ferroelectric liquid crystal under voltage application and in the absence of a voltage.

Incidentally, in a ferroelectric liquid crystal cell placed in a memory cell in the presence of an alignment control film provided with a uniaxial orientation axis, a liquid crystal molecules is not always oriented or aligned to form a tilt angle (Ĥ) as shown in FIG. 4 or 5 but is oriented to form an angle θ as shown in FIG. 6. This point has been discussed in U.S. Pat. No. 4,712,873 to Kanbe et al.

FIG. 6 is a schematic plan view illustrating the states of orientation of liquid crystal molecules as viewed from above the base plate face 605.

In the figure, the two-head arrow 600 indicates a direction of a monoaxial orientation treatment, i.e., the direction of rubbing in this embodiment. In the SmA phase, liquid crystal molecules are oriented or aligned in an average molecular axis direction 601 which coincides with the rubbing direction 600. In the SmC* phase, the average molecular axis direction of the liquid crystal molecules is tilted to a direction 602, so that the rubbing direction 600 and the average molecular axis direction 602 forms an angle θ to result in a first stable orientation state. When a voltage is applied between a pair of base plates in this stage, the average molecular axis direction of the liquid crystal molecules in the SmC* phase is changed to a saturation angle (Ĥ) larger than the angle θ, where a third stable orientation state is attained. The average molecular axis direction at this time is denoted by a reference numeral 603. When the voltage is then returned to zero, the liquid crystal molecules are returned to the former first molecular axis direction 602. Accordingly, the liquid crystal molecules have a memory characteristic in the state of the first molecular axis direction 602. When a voltage of the opposite polarity is applied in the state of the molecular axis direction 602 and the voltage is sufficiently high, the average molecular axis direction of the liquid crystal molecules is shifted to and saturated at a fourth stable orientation state giving an average molecular axis direction 603a. Then, when the voltage is returned to zero, the liquid crystal molecules are returned to and settled at the second stable state giving the average molecular axis direction 602a. As a result, when the polarizing direction 604 of one polarizer is set in the same direction as the molecular axis direction 602 forming the angle θ.

In the present invention, the capacitance of an insulating film Ci is calculated according to the following equation (1) based on the dielectric constant ε of the insulating film measured by "LCR Meter 4192A" available from Yokogawa Hewlet-Packard K.K. with a sine wave of ±1 V at a frequency of 1 kHz:

$$Ci = \frac{\epsilon_0 \cdot \epsilon \cdot S}{d},  \qquad \text{Eq. (1)}$$

wherein d denotes the thickness of the insulating film; $\epsilon_0$, dielectric constant of vacuum; and S, area occupied by a pair of opposite electrodes. Further, in a case where the upper and lower substrates of a cell are respectively provided with an insulating film, the Ci of the cell is calculated by the following equation (2):

$$Ci = ((1/Ci_1) + (1/Ci_2))^{-1} \qquad \text{Eq. (2),}$$

wherein $Ci_1$ and $Ci_2$ denote capacitances of insulating films formed on the upper and lower substrates, respectively.

The capacitance $C_{LC}$ (nF/cm$^2$) of a ferroelectric liquid crystal used in the present invention is calculated based on the capacitance $C_{cell}$ of a cell containing the ferroelectric liquid crystal measured by "LCR Meter 4192A" available from Yokogawa Hewlett-Packard K.K. with a sine wave of ±1 V at a frequency of 20 kHz and with a DC bias application. Thus, $C_{LC}$ is calculated as follows: $C_{LC} = ((1 C_{cell}) - (1/Ci)^{-1}$ (as obtained above).

Figure 7:
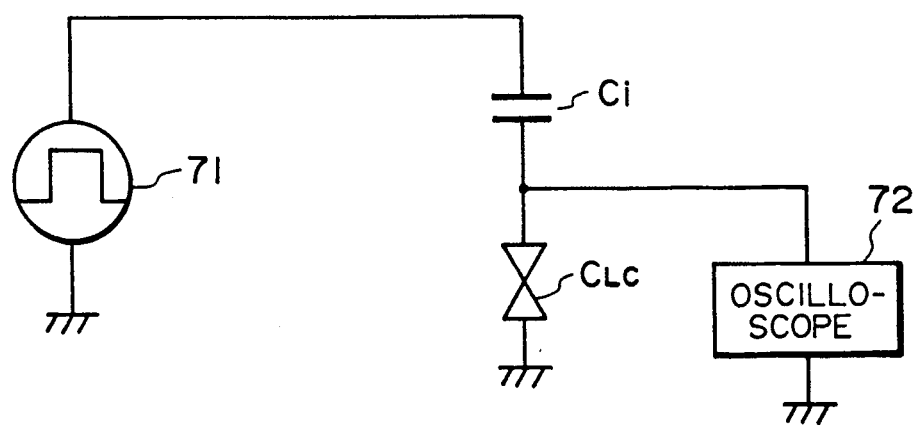
FIG. 7 is a circuit diagram of an apparatus for measurement of a spontaneous polarization used in the present invention.

FIG. 7 is an equivalent circuit diagram of a circuit used for measurement of spontaneous polarization Ps. In the FIG. 7, a reference numeral 71 denotes a pulse generator; 72, an oscilloscope; $C_{LC}$, a capacitance of a ferroelectric liquid crystal; and Ci, a capacitance of an insulating film. The spontaneous polarization Ps (nC/cm$^2$) of a ferroelectric liquid crystal is calculated from the following equation (3):

$$P_s = \frac{\Delta V_{LC}(C_i + C_{LC})}{2S}. \qquad \text{Eq. (3)}$$

wherein S denotes an area occupied by opposite electrodes (cm$^2$); and $\Delta V_{LC}$, a voltage drop as shown at FIG. 8(b). Incidentally, in the Examples described hereinafter, the measurement of Ps was carried out at 25° C.

Referring to FIG. 8(a), there is shown a voltage waveform applied from the pulse generator 71, and at FIG. 8(b) is shown a voltage waveform $V_{LC}$ applied to a ferroelectric liquid crystal based on the application of the above pulse voltage. $\Delta V_{LC}$ therein denotes a voltage drop, and $V_{rev}$ denotes a reverse polarity voltage. Further, at FIG. 8(c) is shown a corresponding change in optical characteristic. $V_{LC}$ mentioned above corresponds to a voltage required for a liquid crystal molecule oriented to the axis 602b (or 602a) shown in FIG. 6 to switch to the axis 602a (or 602b).

Hereinbelow, the present invention is explained based on Examples.

EXAMPLE 1

Preparation of Cell A

A transparent substrate provided with an ITO transparent electrode film was coated with a 1000 Å-thick SiO$_2$ film by using a sputtering apparatus. On the 1000 Å-thick SiO$_2$ film was formed a 200 Å-thick polyimide film ("SP-710" available from Toray K.K.), which was then treated by rubbing. Two substrates treated in the above described manner were superposed with each other so that their rubbing directions crossed each other and they were fixed to each other with a prescribed spacing by disposing SiO$_2$ beads with an average diameter of 1.5 μm. Thus, a cell A was prepared.

Preparation of Cell B

A cell B was prepared in the same manner as in the preparation of the cell A except that the SiO$_2$ film was formed in a thickness of 500 Å.

Preparation of Cell C

A cell C was prepared in the same manner as in the preparation of the cell B except that the SiO$_2$ film was replaced by a 500 Å-thick Al$_2$O$_3$ film and the 200 Å-thick polyimide film was replaced by a polyimide film in a thickness of 30 Å (approximate). The polyimide film in this instance was formed by spinner-coating a 0.25 wt. % solution in DMAC (dimethylacetamide) of polyamic acid (SP-710 available from Toray K.K.); a polyimide precursor, followed by heating at 300° C. for 30 minutes.

Preparation of Cell D

A cell D was prepared in the same manner as in the preparation of the cell C except that the Al$_2$O$_3$ film was replaced by a 1000 Å-thick TiO$_2$ film.

Preparation of Cell E

A cell E was prepared in the same manner as in the preparation of the cell C except that the Al$_2$O$_3$ film was replaced by a 500 Å-thick Si$_3$N$_4$ (silicon nitride) film formed by thermal CVD of a gas mixture of SiH$_4$ and NH$_3$.

Preparation of Cell F (Comparative)

A cell F was prepared in the same manner as in the preparation of the cell A except that the 1000 Å-thick SiO$_2$ film was omitted.

Each of the above cells A-E was prepared in a number of six, which were respectively filled with ferroelectric liquid crystals CS-1014 (mfd. by Chisso K.K.), CS-1017 (Chisso), CS-1018 (Chisso), CS-1016 (Chisso), ZLI-3775 (Merck) and ZLI-3654 (Merck).

Each cell sample filled with one of the above ferroelectric liquid crystals was subjected to measurement of spontaneous polarization Ps at 25° C. The measured values are summarized in Table 1 below. Incidentally, the measured values showed that one ferroelectric liquid crystal provided substantially the same spontaneous polarization Ps for different cell structures.

TABLE 1

| Ferroelectric liquid crystal | (Ps) Ps (nC/cm$^2$) |
|---|---|
| CS-1014 | 3.2 |
| CS-1017 | 5.4 |
| CS-1018 | 12.0 |
| CS-1016 | 5.1 |
| ZLI-3775 | 18.7 |
| ZLI-3654 | 19.4 |

Separately, a coated substrate structure of transparent substrate/transparent electrode/insulating film (including a polyimide alignment control film) identical to one used in each of the sample cells A-F above, and the dielectric constant of the insulating film was measured by the above mentioned LCR Meter. Based on the measured values, the capacitances of the insulating films used in the sample cells A-F were calculated. The results are summarized in the following Table 2.

TABLE 2

| Sample cell | (Ci) Capacitance (nF/cm$^2$) |
|---|---|
| Cell A | 12.7 |
| Cell B | 21.8 |
| Cell C | 75 |
| Cell D | 310 |
| Cell E | 58 |
| Cell F | 73 |

Then, the respective cells A-F each filled with the six kinds of ferroelectric liquid crystals were subjected evaluation of bistability by observation through a polarizing microscope. The results are shown in the following Table 3.

TABLE 3

| | (Bistability) FLC | | | | | |
|---|---|---|---|---|---|---|
| Sample Cell | CS-1018 | CS-1017 | CS-1014 | CS-1016 | ZLI-3775 | ZLI-3654 |
| Cell A<br>Ci = 12.7 nF/cm$^2$ | x | Δ | o | Δ | x | x |
| Cell B<br>Ci = 21.8 nF/cm$^2$ | Δ | o | o | o | x | x |
| Cell C<br>Ci = 75 nF/cm$^2$ | o | o | o | o | o | o |
| Cell D<br>Ci = 310 nF/cm$^2$ | o | o | o | o | o | o |
| Cell E<br>Ci = 58 nF/cm$^2$ | Δ | o | o | o | Δ | Δ |
| Cell F | o | o | o | o | o | o |

TABLE 3-continued (Bistability)

| Sample Cell | FLC | | | | | |
|---|---|---|---|---|---|---|
| | CS-1018 | CS-1017 | CS-1014 | CS-1016 | ZLI-3775 | ZLI-3654 |
| $C_i = 73 \text{ nF/cm}^2$ | | | | | | |

Herein, FLC stands for ferroelectric liquid crystal, and the symbols used for evaluation of bistability stands for the following states:

○ : Good bistability
Δ : Good bistability in a partial region
× : Not showing bistability The evaluation of bistability is based on a method wherein, under observation through a polarizing microscope, a pulse voltage of one polarity exceeding a threshold voltage of FLC is applied, followed by observation of a memory state after removal of the voltage, and a voltage of a reverse polarity is applied, followed by observation of a memory state after removal of the voltage.

The capacitances $C_{LC}$ and the calculated values of $2Ps - C_{LC}$ and $7Ps - C_{LC}$ obtained for the ferroelectric liquid crystals (FLC) used in the sample cells A–F are summarized in the following Table 4.

TABLE 4

| FLC | $C_{LC}$ (nF/cm$^2$) | $(C_{LC} \cdot 2Ps - C_{LC} \cdot 7Ps - C_{LC})$ | |
|---|---|---|---|
| | | $2Ps - C_{LC}$ | $7PS - C_{LC}$ |
| CS-1018 | 2.4 | 21.6 | 81.6 |
| CS-1017 | 2.4 | 8.4 | 35.4 |
| CS-1014 | 2.1 | 4.3 | 20.3 |
| CS-1016 | 2.3 | 8.1 | 34.1 |
| ZLI-3489 | 2.7 | 34.7 | 128.2 |
| ZLI-3654 | 3.4 | 35.4 | 132.4 |

The results shown in the above Tables 3 and 4 will provide the following observation. The comparative cell F showed good bistability, but involves a liability of occurrence of short circuit between the upper and lower electrodes. In the above examples, a small size cell (2 cm × 4 cm) for experimental purpose was used. However, if a larger panel of e.g., 12 inch size is used, the above-mentioned liability of short circuit between the upper and lower electrodes is increased much more.

In contrast thereto, with respect to the sample cells A–E provided with an insulating film for short circuit prevention, those cells satisfying the condition of $C_i \geq 2 \cdot Ps - C_{LC}$, particularly $C_i \geq 7 \cdot Ps - C_{LC}$, selectively provided an excellent bistable switching characteristic.

As described above, according to the present invention, it is possible to solve the problem of obstruction to bistable inversion switching caused by the presence of an insulating film of 200 Å or larger in thickness provided for preventing short circuit between the upper and lower electrodes and also become possible to use a ferroelectric liquid crystal having a large spontaneous polarization Ps regardless of the presence of the above-mentioned insulating film, so that a display panel of a large area can be realized.

EXAMPLE 2

A substrate provided with 230 μm-wide transparent electrode stripes at a pitch of 250 μm was coated with a 1000 Å-thick titanium dioxide film by EB (electron beam) vapor deposition. The titanium oxide film formed by EB vapor deposition showed a dielectric constant ε of 102 as measured by means of an impedance analyzer ("LCR Meter 4192A", available from Yokogawa Hewlett-Packard K.K.) at a frequency of 20 kHz. The titanium dioxide film was further coated with a 300 Å-thick film of polyimide ("SP710" available from Toray K.K.) through application and heating, and the polyimide film was then treated by rubbing.

Two substrates prepared in the above manner were fixed to each other to form a cell so that their transparent stripes crossed at right angles and their rubbing directions were in parallel.

In to the cell, a ferroelectric liquid crystal ("ZLI 3774" available from Merck Co.) showing the following phase transition characteristic

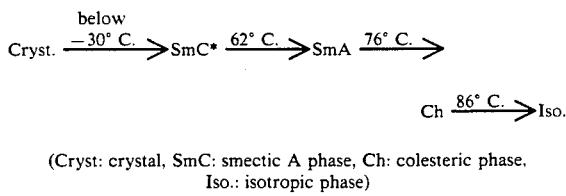

(Cryst: crystal, SmC: smectic A phase, Ch: colesteric phase, Iso.: isotropic phase)

and heated into isotropic phase was sealed up. The liquid crystal cell was gradually cooled at a rate of 0.5° C./min., and the switching characteristic thereof was observed at room temperature (about 25° C.).

Figure 9B:
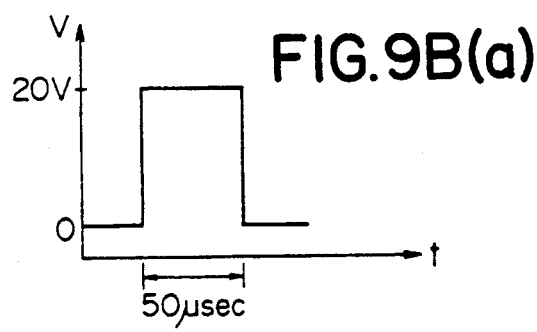
FIGS. 9B(a)-9B(c) are a characteristic view showing an electro-optical effect of a ferroelectric liquid crystal device according to the present invention.
Figure 9B:
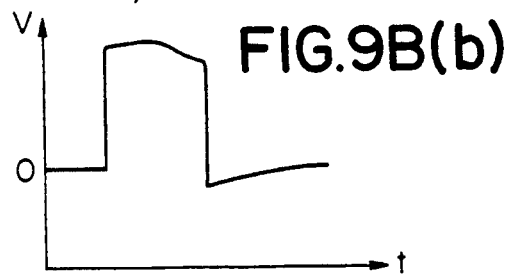
Figure 9B:
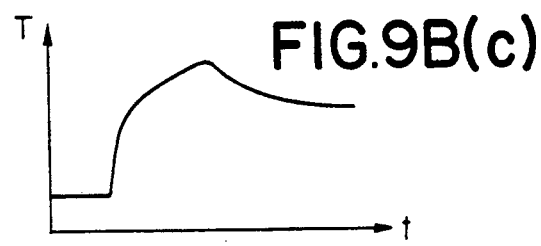

As shown in FIG. 9B, the bistability was evaluated by repetitive application of a single polarity pulse (pulse duration: 50 μsec, peak value: 20 V) in reverse polarities. The electro-optical response of the liquid crystal was observed through cross nicol polarizers, whereby the state defined by the application of the pulse was retained in the absence of an electric field as shown at FIG. 9B(c) so that the bistability was confirmed.

COMPARATIVE EXAMPLE 1

A liquid crystal cell was prepared in the same manner as in Example 2 except that an 800 Å-thick polyimide film was used instead of the 300 Å-thick polyimide film, and the liquid crystal cell was tested in a similar manner. The results are shown in FIG. 9A.

More specifically, FIG. 9A shows an applied voltage and an optical response thereto of a ferroelectric liquid crystal cell outside the present invention in contrast with those of the ferroelectric liquid crystal device of the present invention shown in FIG. 9B. In the figures, t denotes time; V, a voltage; and T, a transmittance (relative).

As shown in these figures, in the liquid crystal cell outside the present invention (FIG. 9A), an abrupt voltage drop occurred during the application of a pulse voltage and a large voltage of a reverse polarity was applied to the liquid crystal after the removal of the pulse voltage as shown at FIG. 9A(b). As a result, an original dark state was resumed when the voltage was removed as shown at FIG. 9A(c). In other words, inversion switching was not effected by a voltage of 20 V and a pulse duration of 50 μsec. In contrast thereto, in the liquid crystal cell of the present invention (FIG. 9B), a voltage decrease occurred little during the pulse voltage application, and only a small voltage of a reverse polarity was caused at the time of removal of the pulse voltage. As a result, in the liquid crystal cell of the present invention, a bright state obtained at the time of voltage application was substantially retained as shown at FIG. 9B(c). Thus, inversion switching was effected by a pulse voltage of 20 V and a duration of 50 μsec according to the cell of the present invention.

EXAMPLE 3

A liquid crystal cell was prepared and tested in the same manner as in Example 2 except that the liquid crystal was replaced by "CS 1018" (available from Chisso K.K.) showing the following phase transition characteristic:

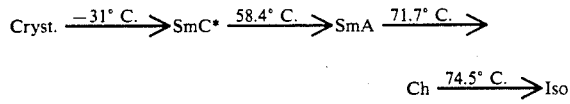

As a result, it was confirmed that the liquid crystal cell showed good bistability similarly as in Example 2.

EXAMPLE 4

A substrate provided with transparent electrodes identical to the one used in Example 2 was coated with a 5%-isopropyl alcohol solution of an organo-tin compound (acetylacetonatotin, available from Shokubai Kasei K.K.) by a spinner coater, followed by heating to form an 800 Å-thick $SnO_2$ film, which showed a dielectric constant of 26 (measured at a frequency of 20 kHz).

By using the same cell structure and liquid crystal material as in Example 2 except for the above point, a liquid crystal cell was prepared.

Good bistability was obtained similarly as in Example 2.

EXAMPLE 5

A liquid crystal cell was prepared and tested in the same manner as in Example 2 except that the 300 Å-thick polyimide film was replaced by a 300 Å-thick polyvinyl alcohol film, whereby similar results as in Example 2 were obtained.

EXAMPLE 6

A liquid crystal cell was prepared and tested in the same manner as in Example 2 except that the 300 Å-thick polyimide film was replaced by a 200 Å-thick film of a polyimide having the following recurring unit, whereby similar results as in Example 2 were obtained.

The thus-obtained polyamic acid was dissolved in dimethylformamide at a concentration of 2 wt. % and applied by a spinner rotating at 3000 r.p.m. in 180 seconds. The coating film was then heated for curing at 250° C. for 1 hour to form an about 200 Å-thick coating film of the polyimide having a recurring unit of the above formula.

EXAMPLE 7

A liquid crystal cell was prepared and tested in the same manner as in Example 2 except that, prior to the coating of the polyimide film, the titanium dioxide film formed by EB vapor deposition was coated by dipping with a 5% solution of diethoxydimethylsilane in toluene, followed by heating at 80° C. for 30 min to form a polyorganosilane film. As a result, an improvement in optical responsive characteristic was observed as compared with the liquid crystal cell in Example 2. The improvement in optical response characteristic was a decrease in flickering on a screen during multiplex driving as disclosed in U.S. Pat. No. 4,655,561.

Similar results were obtained also when the above-mentioned diethoxydimethylsilane was replaced by other silane monomers, such as dimethyldichlorosilane, diethoxydiphenylsilane or methyltriethoxysilane/dimethyldiethoxysilane (=1/1) or prepolymers.

EXAMPLE 8

A liquid crystal cell was prepared and tested in the same manner as in Example 2 except that the titanium dioxide film formed by EB vapor deposition was replaced by a 1000 Å-thick $BaTiO_3$ film formed by sputtering, whereby similar results as shown in Example 2 were obtained. The 1000 Å-thick $BaTiO_3$ film showed a dielectric constant of 150 as measured in the same manner as in Example 2.

EXAMPLE 9

A liquid crystal cell was prepared and tested in the same manner as in Example 2 except that the 300 Å-thick polyimide film was replaced by a 300 Å-thick SiO film formed by oblique vapor deposition at an angle of 5°, whereby similar results as in Example 2 were obtained.

COMPARATIVE EXAMPLE 2

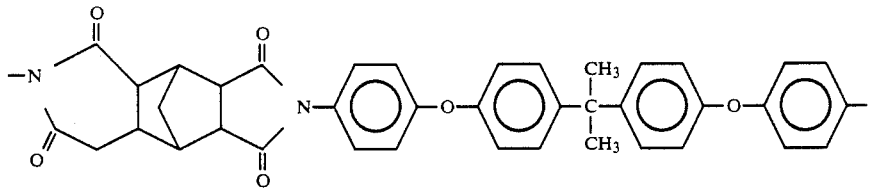

The polyimide film was prepared in the following manner.

12.3 g of 2,2-bis(4-(4-aminophenoxyphenyl)propane was added to 189 ml of N,N-dimethylformamide and stirred to form a uniform solution. Further, 7.5 g of 3,5,6-tricarboxy-2-carboxymethylnorbornane-2:3, 5:6-dianhydride was added thereto, followed by 6 hours of stirring at room temperature to obtain a slightly brownish viscous liquid. The viscous liquid was poured in a large amount of toluene to cause precipitation, whereby 17.6 g of a polyamic acid was obtained in the form of a white solid.

A liquid crystal cell was prepared and tested in the same manner as in Example 2 except that the titanium dioxide film was replaced by a 1000 Å-thick silicon dioxide film formed by sputtering, whereby similar results as those shown in FIG. 9A were obtained. The 1000 Å-thick silicon dioxide film showed a dielectric constant of 3.1 as measured in the same manner as in Example 2.

EXAMPLES 10-16, COMPARATIVE EXAMPLES 3-4

Liquid Crystal cells were prepared in the cell structure shown in FIG. 2D where the insulating films for short circuit prevention 109a, 109b and the alignment control films 105a and 105b were prepared under the conditions shown in the following Table 5.

TABLE 5

| Example No. | Insulating films 109a, 109b (1000Å-thick) | | Alignment control films 105a, 105b (1000Å-thick) | | |
|---|---|---|---|---|---|
| | Material | Dielectric constant $\epsilon$ (at 20 kHz) | Material | Volume resistivity | Type |
| 10 | $TiO_2$ | 102 | JPAI 12 (Nihon Gohsei K.K.) (ammonia salt-modified polyamic acid) | $2 \times 10^9$ $\Omega$cm | polyimide |
| 11 | $TiO_2$ | 102 | RN 305 (Nissan Kagaku K.K.) (amide-modified polyimide) | $5 \times 10^9$ $\Omega$cm | polyimide |
| 12 | $TiO_2$ | 102 | Z 200 (Nihon Gosei K.K.) (carbonyl-modified polyvinyl alcohol) | $1 \times 10^8$ $\Omega$cm | PVA |
| 13 | $TiO_2$ | 102 | SiO | 0 $\Omega$cm | SiO |
| 14 | $BaTiO_3$ | 150 | JAP 12 (Nihon Gohsei K.K.) (ammonium-modified polyamic acid) | $2 \times 10^9$ $\Omega$cm | polyimide |
| 15 | $SnO_2$ | 25 | Z 200 (Nihon Gohsei K.K.) (carbonyl-modified polyvinyl alcohol) | $1 \times 10^8$ $\Omega$cm | PVA |
| 16 | $SnO_2$ | 25 | JPAI 12 (Nihon Gohsei K.K.) (ammonium salt-modified polyamic acid) | $2 \times 10^9$ $\Omega$cm | polyimide |
| Comp. 3 | $SiO_2$ | 3.1 | JPAI 12 (Nihon Gohsei K.K.) (ammonium salt-modified polyamic acid) | $2 \times 10^9$ $\Omega$cm | polyimide |
| Comp. 4 | $TiO_2$ | 102 | SP 710 (Toray K.K.) (polyimide) | $5 \times 10^{12}$ $\Omega$cm | polyimide |

The substrates used in Examples 10-12, 14-16 and Comparative Examples 3, 4 were respectively treated by rubbing, and on the substrate of Example 13, a 1000 Å-thick SiO film was formed by oblique vapor deposition at a vapor deposition angle of 5°. The SiO film showed a volume resistivity of 0 $\Omega$.cm because of its porosity.

Then, each pair of substrates were fixed in parallel with lack other to form a cell, which was then filled with a ferroelectric liquid crystal "CS 1018" available from Chisso K.K.) showing the following phase transition characteristic.

$$\text{Cryst.} \xrightarrow{-31°\text{ C.}} \text{SmC*} \xrightarrow{58.4°\text{ C.}} \text{SmA} \xrightarrow{71.7°\text{ C.}}$$

$$\text{Ch} \xrightarrow{74.5°\text{ C.}} \text{Iso}$$

The cell was then gradually cooled at a rate of 0.5° C./min to form a liquid crystal cell.

Figure 11A:
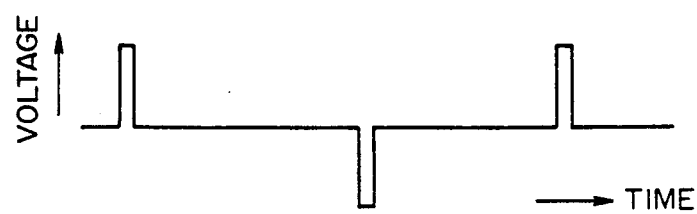
FIGS. 11(a), 11(b), 12(a) and 12(b) are diagrams showing relationships between applied voltage waveforms and optical responses in an Example 1 and a Comparative Example 1, respectively.

Each liquid crystal cell thus prepared was sandwiched between a pair of polarizers arranged in cross nicols and supplied with a single polarity pulse which charging its polarity alternately as shown at FIG. 11(a) to evaluate the bistability through observation of the switching characteristic.

Figure 11B:
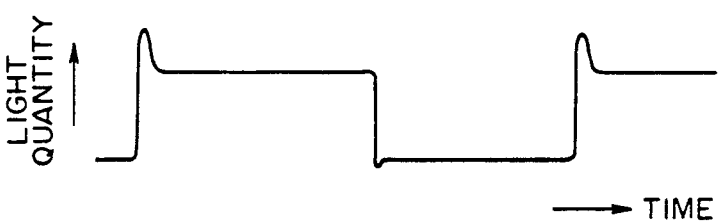

When the optical response was detected by a photomultiplier, good bistability was observed with respect to the cells of Examples 10-16. As a representative, the optical response of the cell of Example 10 is shown at FIG. 11(b). Thus, the liquid crystal state given by the pulse application was retained after turning off the pulse so that the bistability was confirmed.

The above results of Examples 10-16 were obtained respectively with a cell having both substrates coated with a short circuit prevention film. With respect to Examples 10-12, a cell having only one substrate covered with short circuit prevention layer was also prepared and tested in the same manner. Similar results were obtained also by such a cell having a short circuit prevention layer as those obtained by a cell having a short circuit prevention layer on both substrates described above.

Figure 12A:
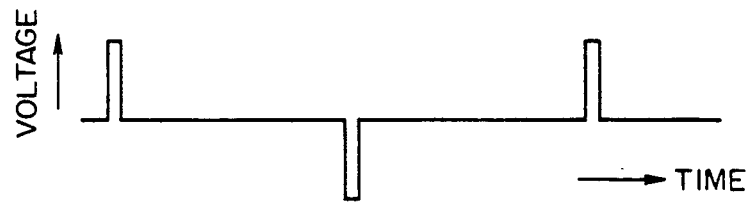
Figure 12B:
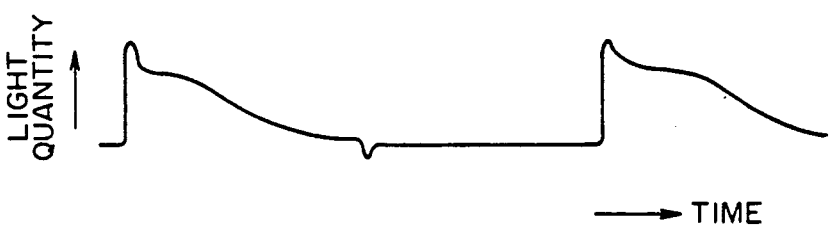

The optical responses of the cells of Comparative Examples 3 and 4 were also detected by a photomultiplier. The applied pulse are the optical response of the cell of Comparative Example 3 are shown in FIG. 12 at (a) and (b), respectively. As shown at FIG. 12(b), the liquid crystal state given by the pulse application was not retained after removal of the pulse and the light quantity gradually decreased, so that it was confirmed that the bistability was not realized.

As described above, in the liquid crystal device of the present invention, two insulating layers are formed on a substrate including a first layer composed of a highly dielectric material and a second layer composed of a low-resistivity dielectric material, so that the capacitance of the insulating layers is increased to provide a liquid crystal layer with a reliable bistability and realize a smooth switching action of the liquid crystal.

EXAMPLE 17

Measurement of Dielectric Constant

An $SiO_2$ film was vapor-deposited in a conventional manner on an Si(n+) wafer and the thickness thereof was measured to be 1.12 $\mu$m according to the step difference measurement method.

A circular aluminum electrode was disposed thereon so as to provide a diameter of 1 mm by vapor deposition.

The capacitance between the Si (n+) wafer and the aluminum electrode was measured by a capacitance meter (Model 4192A, available from Yokogawa Hewlett-Packard K.K.), and the dielectric constant of the $SiO_2$ film was measured from the following equations:

$$C = \frac{\epsilon_1 \cdot \epsilon_0 \cdot S}{d}$$

$$\therefore \epsilon_1 = \frac{C \cdot d}{885.4 \cdot S}$$

C: capacitance
d: thickness
$\epsilon_0$: dielectric constant of vacuum
S: electrode area
$\epsilon_1$: dielectric constant of the sample As a result, the dielectric constant $\epsilon_1$ of $SiO_2$ was calculated to be 3.85.

Similarly, a 2% dimethylacetoamide solution of a polyimide precursor ("SP-710" available from Toray K.K. was applied on an Si(n+) wafer by a spinner and then heated at 300° C. for 60 min to cause condensation-curing to form a polyimide film, on which an aluminum electrode was formed. Through the capacitance measurement, the dielectric constant $\epsilon_2$ of the polyimide resin [SP710] was calculated to be 3.23.

A ferroelectric liquid crystal device was prepared in the following manner by using the $SiO_2$ for a primer layer and the polyimide for an alignment control layer.

Preparation of Device

Two 0.7 mm-thick glass plates were provided and respectively coated with an ITO film to form an electrode for voltage application, which was further coated with a 500 Å-thick vapor-deposited $SiO_2$ layer. On the $SiO_2$ layer, a 0.2%-solution of silane coupling agent (KBM-602, available from Shinetsu Kagaku K.K.) in isopropyl alcohol was applied by spinner coating at a speed of 2000 rpm for 15 second and subjected to hot curing treatment at 120° C. for 20 minutes.

Further, each glass plate provided with an ITO film and treated in the above described manner was coated with 1.3%-solution of polyimide resin precursor (SP-510, available from Toray K.K.) in dimethylacetoamide by a spinner coater rotating at 2100 rpm for 15 seconds. Thereafter, the coating film was subjected to heat curing at 300° C. for 60 min. to obtain about 180 Å-thick film. The coating film was rubbed with acetate fiber-planted cloth. The thus treated two glass plates were washed with isopropyl alcohol. After alumina beads with an average particle size of 2 μm were dispersed on one of the glass plates, the two glass plates were applied to each other with a bonding sealing agent (Lixon Bond available from Chisso K.K.) so that their rubbed directions were parallel to each other and heated at 100° C. for 60 min to form a blank cell. The cell gap was found to be about 2 μm as measured by a Berek compensator.

The thus prepared cell was filled under vacuum with a ferroelectric liquid crystal compound having the following structural formula (I) (wherein C* denotes an optically active asymmetric carbon atom):

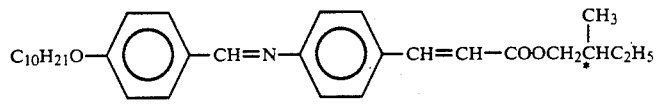 (I)

heated to an isotropic phase and then the cell was gradually cooled from an isotropic temperature to 30° C. at a rate of 5° C./hour, followed by restoration to a normal pressure to obtain a ferroelectric liquid crystal device.

Then, the optical response time (time from voltage application until the transmittance change reaches 90% of the maximum) was measured for the ferroelectric liquid crystal device under the application of a peak-to-peak voltage of 20 V in combination with right-angle cross-nicol polarizers, whereby a response time of 100 μsec was obtained at 80° C.

A clear switching action was observed, and the alignment was also good to provide a monodomain state. Further, bistability resultant after the termination of an applied voltage was also good.

50 ferroelectric liquid crystal devices were similarly prepared in substantially the same manner and then subjected to similar measurement and observation, whereby all the devices showed equally good results and no short circuit occurred between the upper and lower electrodes.

EXAMPLE 18

A ferroelectric liquid crystal device was prepared in the same manner as in Example 17 except that the primer layer was formed from $Si_3N_4$ ($\epsilon = 6.6$) instead of $SiO_2$ ($\epsilon = 3.85$) and the alignment control film was formed from polyvinyl alcohol (PVA 17 ($\epsilon = 6.2$), available from Kuraray K.K.) instead of the polyimide resin (SP-710 ($\epsilon = 3.23$), available from Toray K.K.). The device was examined in the same manner as in Example 17.

As a result, an optical response time of 105 μsec was measured at 80° C.

This ferroelectric liquid crystal device also showed a clear switching action, and the alignment was also good to provide a monodomain state. Further, bistability resultant after the termination of an applied voltage was also good.

50 ferroelectric liquid crystal devices were similarly prepared in substantially the same manner and then subjected to similar measurement and observation, whereby most devices showed substantially good results and only one short circuit occurred between the upper and lower electrodes.

EXAMPLE 19

A ferroelectric liquid crystal device was prepared and examined in the same manner as in Example 17 except that the ferroelectric liquid crystal compound was replaced by a compound having the following structural formula (II):

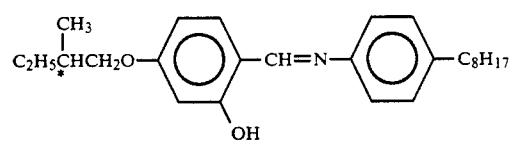
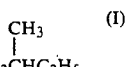

A response time of 500 μsec was measured at 40° C. At 40° C., a clear switching action was observed, and the alignment was also good to provide a monodomain state. Further, bistability resultant after the termination of an applied voltage was also good.

50 ferroelectric liquid crystal devices were similarly prepared in substantially the same manner and then subjected to similar measurement and observation, whereby all the devices showed equally good results and no short circuit occurred between the upper and lower electrodes.

EXAMPLE 20

A ferroelectric liquid crystal device was prepared and examined in the same manner as in Example 19 except that the primer layer and the alignment control layer were replaced by those used in Example 18.

A response time of 550 μsec was measured at 40° C.

This cell also showed a clear switching action, and the alignment was also good to provide a monodomain state. Further, bistability resultant after the termination of an applied voltage was also good.

50 ferroelectric liquid crystal devices were similarly prepared in substantially the same manner and then subjected to similar measurement and observation, whereby all the devices showed equally good results and no short circuit occurred between the upper and lower electrodes.

EXAMPLE 21

A ferroelectric liquid crystal device was prepared and examined in the same manner as in Example 17 except that the alignment control layer was formed from a polyimide resin ("Sun-Ever 150" ($\epsilon=3.1$), Nissan Kagaku Kogyo) instead of the polyimide resin ("SP710" ($\epsilon=3.23$), Toray K.K.).

A response time of 95 μsec was measured at 80° C.

This cell also showed a clear switching action, and the alignment in the device was also good to provide a monodomain state. Further, bistability resultant after the termination of an applied voltage was also good.

50 ferroelectric liquid crystal devices were similarly prepared in substantially the same manner and then subjected to similar measurement and observation, whereby all the devices showed equally good results and no short circuit occurred between the upper and lower electrodes.

EXAMPLE 22

A ferroelectric liquid crystal device was prepared and examined in the same manner as in Example 19 except that the primer layer was formed from $Al_2O_3$ ($\epsilon=10.0$) instead of the $SiO_2$ and the alignment control layer was formed from a polyimide resin ("RN 305" ($\epsilon=5.5$), available from Nissan Kagaku Kogyo K.K.) instead of the polyimide resin ("SP710" ($\epsilon=3.23$), Toray K.K.).

A response time of 520 μsec was measured at 40° C.

This cell also showed a clear switching action, and the alignment was also good to provide a monodomain state. Further, bistability resultant after the termination of an applied voltage was also good.

50 ferroelectric liquid crystal devices were similarly prepared in substantially the same manner and then subjected to similar measurement and observation, whereby all the devices showed equally good results and no short circuit occurred between the upper and lower electrodes.

COMPARATIVE EXAMPLE 5

A ferroelectric liquid crystal device was prepared and examined in the same manner as in Example 17 except that the thickness of the $SiO_2$ layer was reduced to 50 Å. As a result, short circuit frequently occurred between the upper and lower electrodes so that reproducible measurement results were not obtained.

Further, even in a device susceptible of measurement, undesirable phenomena such as local switching failure were observed.

COMPARATIVE EXAMPLE 6

A ferroelectric liquid crystal device was prepared and evaluated in the same manner as in Example 17 except that the polyimide layer was formed in a thickness of 800 Å. As a result, a remarkably worse optical responsive characteristic was observed as represented by an optical response of 250 μsec measured at 80° C.

Further, the alignment in the device was somewhat disordered and satisfactory monodomain could not be obtained.

COMPARATIVE EXAMPLE 7

A ferroelectric liquid crystal device was prepared and evaluated in the same manner as in Example 17 except that the polyimide resin was replaced by polyvinyl alcohol resin ($\epsilon=9.8$, available from Kuraray K.K.). As a result, a response time of 120 μsec was measured at 80° C.

The ferroelectric liquid crystal device caused poor switching characteristic such as occurrence of flickering to provide a picture defect.

Further, the alignment in the device was disordered and the bistability after the termination of voltage application was not stable.

EXAMPLES 23-34

Ferroelectric liquid crystal devices were prepared and examined in the same manner as in Example 17 except that one or both of the primer layer and the alignment control layer were replaced by those shown in the following Table 6.

TABLE 6

| Example No. | Primer layer | | | Alignment control layer | | |
|---|---|---|---|---|---|---|
| | Material | Thickness (Å) | $\epsilon_1$ | Material | Thickness (Å) | $\epsilon_2$ |
| 23 | $SiO_2$ | 500 | 3.8 | Polyamide-imide (Torlon, Mitsubishi Kasei) | 150 | 3.2 |
| 24 | $Al_2O_3$ | 600 | 10.0 | Xylene resin (Nihanol, Mitsubishi Gas Kagaku) | 180 | 4.6 |
| 25 | $SiO_2$ | 500 | 3.8 | Polyester (Bylon, Toyobo) | 160 | 3.4 |
| 26 | $TiO_2$ | 700 | 40 | Polycarbonate (Teijin Panlite, Teijin) | 170 | 3.1 |
| 27 | $SiO_2$ | 650 | 3.8 | Polyvinyl butyral (S-Lec β, Sekisui) | 280 | 3.3 |
| 28 | $SiO_2$ | 450 | 3.8 | Polyvinyl acetate (Gohsenyl, Nihon Gohsei) | 250 | 3.1 |
| 29 | $Si_3N_4$ | 550 | 6.6 | Polyamide (Amilan, Toray K.K.) | 220 | 3.8 |
| 30 | $Si_3N_4$ | 600 | 6.6 | Polystyrene (Hiresin, Hitachi Kasei) | 290 | 2.6 |
| 31 | $SiO_2$ | 500 | 3.8 | Cellulose (CAB, Eastman Kodak) | 330 | 3.2 |
| 32 | $Si_3N_4$ | 500 | 6.6 | Melamin resin (National-Light Melamin, Matsushita Denko) | 150 | 5.6 |
| 33 | $SiO_2$ | 550 | 3.8 | Urea resin (National-Light-Urea, | 160 | 3.5 |

TABLE 6-continued

| Example No. | Primer layer | | | Alignment control layer | | |
|---|---|---|---|---|---|---|
| | Material | Thickness (Å) | $\epsilon_1$ | Material | Thickness (Å) | $\epsilon_2$ |
| 34 | SiO$_2$ | 600 | 3.8 | Matsushita Denko) Acrylonitril (Cevian-V, Dicel) | 170 | 3.2 |

The thus prepared ferroelectric liquid crystal devices respectively showed a clear switching action. The alignment in the devices was good, and a monodomain state was formed in each device. Further, bistability after the termination of the voltage application was also good, and no short circuit was observed in any device.

As is understood from the above Examples, according to the present invention, there is provided a ferroelectric liquid crystal device wherein a ferroelectric liquid crystal is disposed in a thin layer with a good alignment characteristic and improved short circuit prevention effect between the upper and lower electrodes, image defects such as pixel flickering have been improved and good bistability is shown.

EXAMPLE 35

A blank cell was prepared in the same manner as in Example 17.

Separately, some of the above-enumerated Example compounds were selected and mixed in proportions as indicated below to form a ferroelectric liquid crystal composition.

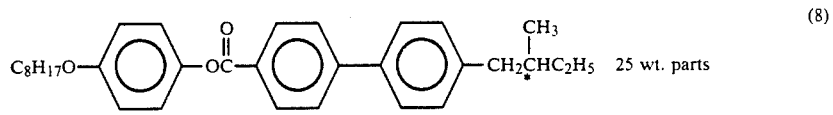
(8)

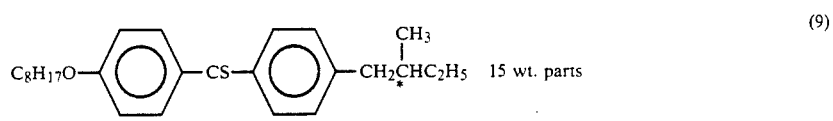
(9)

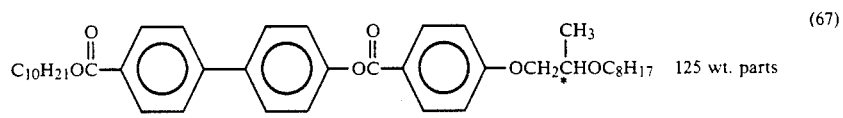
(67)

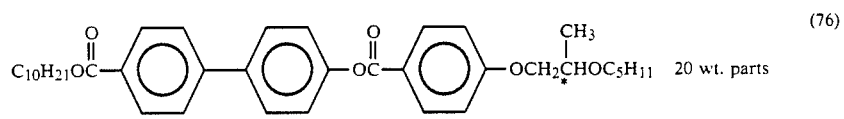
(76)

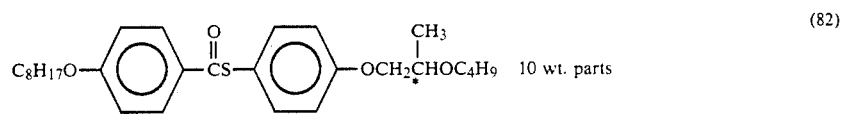
(82)

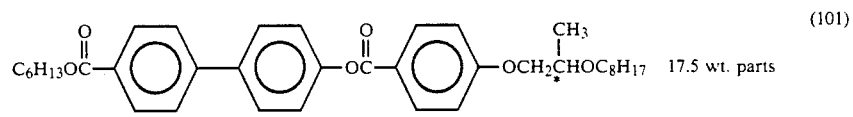
(101)

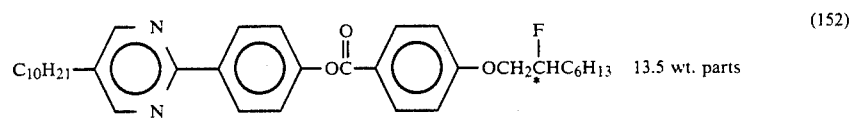
(152)

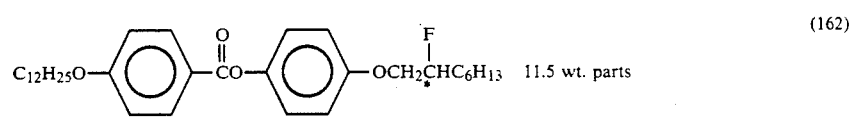
(162)

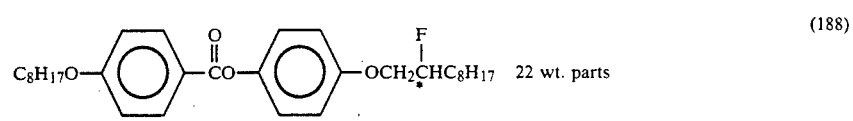
(188)

The thus prepared ferroelectric liquid crystal composition was heated into an isotropic uniform mixture and injected into the above-prepared blank cell under vacuum. The cell was then gradually cooled at a rate of 5° C./hr to 30° C., and the pressure was restored to normal pressure to obtain a ferroelectric liquid crystal device.

Then, the optical response time (time from voltage application until the transmittance change reaches 90% of the maximum) was measured for the ferroelectric liquid crystal device under the application of a peak-to-peak voltage of 20 V in combination with right-angle cross-nicol polarizers, whereby the following results were obtained.

| 15° C. | 30° C. | 45° C. |
|---|---|---|
| 1100 μsec | 290 μsec | 135 μsec |

When the ferroelectric liquid was driven at 30° C., a clear switching action was observed at a contrast of 16. Further, the alignment in the device was good to provide a monodomain state, and bistability after the termination of voltage application was also good.

50 ferroelectric liquid crystal devices were prepared in the same manner and then subjected to similar measurement and observation, whereby all the devices showed equally good results and no short circuit occurred between the upper and lower electrodes. Further the thus prepared ferroelectric liquid crystal devices were subjected to an environmental durability test wherein each device was continually driven for 24 hours under the environmental conditions of 35° C. and 90% humidity, left to stand for 1 week and then again subjected to the above performance evaluation test, whereby no change was observed.

EXAMPLE 36

A ferroelectric liquid crystal device was prepared in the same manner as in Example 35 except that the primer layer was formed from $Si_3N_4$ ($\epsilon=6.6$) instead of $SiO_2$ ($\epsilon=3.8$) and the alignment control film was formed from polyvinyl alcohol (PVA 117 ($\epsilon=6.2$), available from Kuraray K.K.) instead of the polyimide resin (SP-710 ($\epsilon=3.2$), available from Toray K.K.). The device was examined in the same manner as in Example 35, whereby the following results were obtained.

| 15° C. | 30° C. | 45° C. |
|---|---|---|
| 1100 μsec | 305 μsec | 140 μsec |

When the ferroelectric liquid crystal device was driven at 30° C., a clear switching action was observed at a contrast of 15. Further, the alignment in the device was good to provide a monodomain state, and bistability after the termination of voltage application was also good.

50 ferroelectric liquid crystal devices were prepared in the same manner and then subjected to similar measurement and observation, whereby most devices showed substantially good results and only one short circuit occurred between the upper and lower electrodes. Further, when they were subjected to the environmental durability test in the same manner as in Example 35, whereby no change was observed.

EXAMPLE 37

A ferroelectric liquid crystal device was prepared and evaluated in the same manner as in Example 35 except that ferroelectric liquid crystal composition was replaced by the following composition comprising some Example Compounds as described before in the following indicated proportions. Example Compound No.

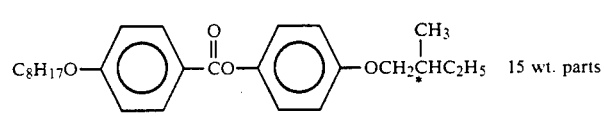
(1) 15 wt. parts

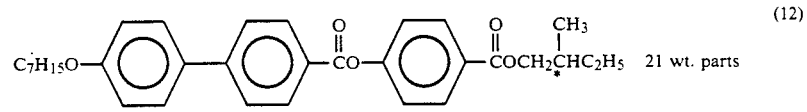
(12) 21 wt. parts

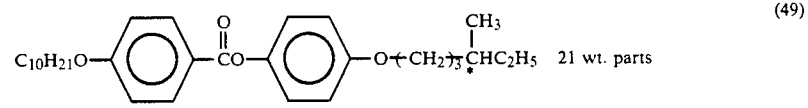
(49) 21 wt. parts

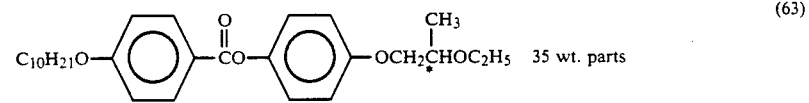
(63) 35 wt. parts

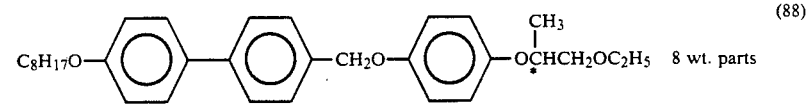
(88) 8 wt. parts

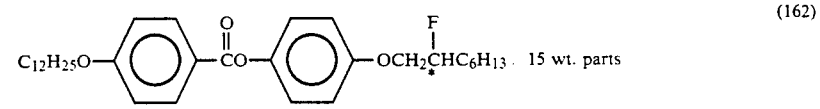
(162) 15 wt. parts

-continued

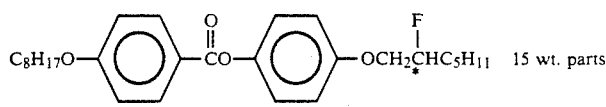 (163) 15 wt. parts

As a result, the following optical response time data were obtained.

| 15° C. | 30° C. | 45° C. |
|---|---|---|
| 890 μsec | 385 μsec | 160 μsec |

When the ferroelectric liquid crystal device was driven at 30° C., a clear switching action was observed at a contrast of 16. Further, the alignment in the device was good to provide a monodomain state, and bistability after the termination of voltage application was also good.

50 ferroelectric liquid crystal devices were prepared in the same manner and then subjected to similar measurement and observation, whereby all the devices showed equally good results and no short circuit occurred between the upper and lower electrodes. Further when the devices were subjected to the environmental durability test in the same manner as in Example 35, whereby no change in evaluation result was observed.

EXAMPLE 38

A ferroelectric liquid crystal device was prepared and evaluated in the same manner as in Example 37 except that the primer and the alignment control layer were replaced by those used in Example 16, whereby the following results were obtained.

| 15° C. | 30° C. | 45° C. |
|---|---|---|
| 900 μsec | 390 μsec | 175 μsec |

When the ferroelectric liquid crystal device was driven at 30° C., a clear switching action was observed at a contrast of 16. Further, the alignment in the device was good to provide a monodomain state, and bistability after the termination of voltage application was also good.

50 ferroelectric liquid crystal devices were prepared in the same manner and then subjected to similar measurement and observation, whereby all the devices showed equally good results and no short circuit occurred between the upper and lower electrodes. Further when the devices were subjected to the environmental durability test in the same manner as in Example 35, whereby no change in evaluation result was observed.

EXAMPLE 39

A ferroelectric liquid crystal device was prepared and evaluated in the same manner as in Example 35 except that ferroelectric liquid crystal composition was replaced by the following composition comprising some Example Compounds as described before in the following indicated proportions.

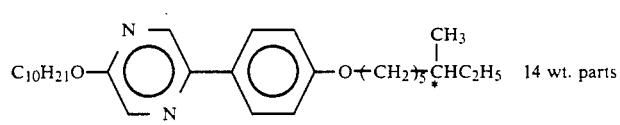 (21) 14 wt. parts

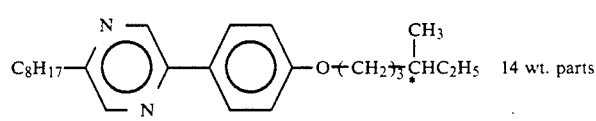 (22) 14 wt. parts

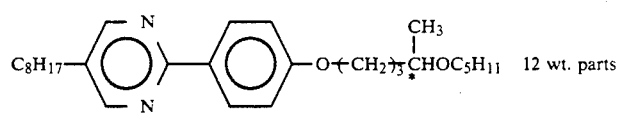 (71) 12 wt. parts

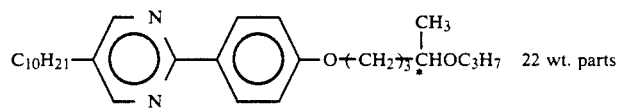 (102) 22 wt. parts

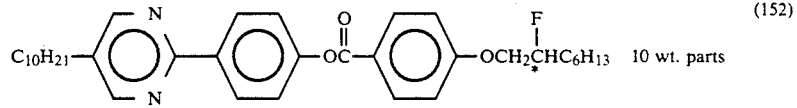 (152) 10 wt. parts

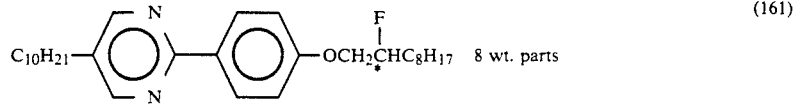 (161) 8 wt. parts

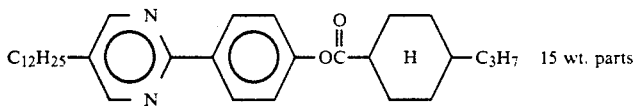

(206) 15 wt. parts

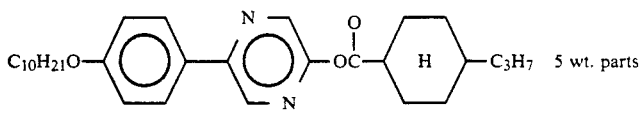

(208) 5 wt. parts

As a result, the following data of optical response time were obtained.

| 15° C. | 30° C. | 45° C. |
|---|---|---|
| 280 μsec | 150 μsec | 105 μsec |

When the ferroelectric liquid crystal device was driven at 30° C., a clear switching action was observed at a contrast of 15. Further, the alignment in the device was good to provide a monodomain state, and bistability after the termination of voltage application was also good.

50 ferroelectric liquid crystal devices were prepared in the same manner and then subjected to similar measurement and observation, whereby all the devices showed equally good results and no short circuit occurred between the upper and lower electrodes. Further when the devices were subjected to the environmental durability test in the same manner as in Example 35, whereby no change in evaluation result was observed.

EXAMPLE 40

A ferroelectric liquid crystal device was prepared and examined in the same manner as in Example 35 except that the alignment control layer was formed from a polyimide resin ("Sun-Ever 150" ($\epsilon=3.1$), Nissan Kagaku Kogyo) instead of the polyimide resin ("SP 710" ($\epsilon=3.2$), Toray K.K.), whereby the following results were obtained.

| 15° C. | 30° C. | 45° C. |
|---|---|---|
| 1055 μsec | 280 μsec | 125 μsec |

When the ferroelectric liquid crystal device was driven at 30° C., a clear switching action was observed at a contrast of 14. Further, the alignment in the device was good to provide a monodomain state, and bistability after the termination of voltage application was also good.

50 ferroelectric liquid crystal devices were prepared in the same manner and then subjected to similar measurement and observation, whereby all the devices showed equally good results and no short circuit occurred between the upper and lower electrodes. Further when the devices were subjected to the environmental durability test in the same manner as in Example 35, whereby no change in evaluation result was observed.

EXAMPLE 41

A ferroelectric liquid crystal device was prepared and examined in the same manner as in Example 37 except that the primer layer was formed from $Al_2O_3$ ($\epsilon=10.0$) instead of the $SiO_2$ and the alignment control layer was formed from a polyimide resin ("RN 305" ($\epsilon=5.5$), available from Nissan Kagaku Kogyo K.K.) instead of the polyimide resin ("SP710" ($\epsilon=3.23$), Toray K.K.), whereby the following results were obtained.

| 15° C. | 30° C. | 45° C. |
|---|---|---|
| 885 μsec | 375 μsec | 155 μsec |

When the ferroelectric liquid crystal device was driven at 30° C., a clear switching action was observed at a contrast of 15. Further, the alignment in the device was good to provide a monodomain state, and bistability after the termination of voltage application was also good.

50 ferroelectric liquid crystal devices were prepared in the same manner and then subjected to similar measurement and observation, whereby all the devices showed equally good results and no short circuit occurred between the upper and lower electrodes. Further when the devices were subjected to the environmental durability test in the same manner as in Example 35, whereby no change in evaluation result was observed.

EXAMPLE 42

The respective ferroelectric liquid crystal compounds used and the resultant ferroelectric liquid crystal composition used in Example 35 were respectively taken in an amount of 40 mg into a sample bottle and subjected to an environmental durability test wherein each sample was left to stand for 1 hour under the environmental conditions of 35° C. and 90% humidity. Each sample after the standing was analyzed by the thin layer chromatography, the high-speed liquid chromatography and DSC in order to detect a change from that before the standing, whereas no change was observed.

COMPARATIVE EXAMPLE 8

A ferroelectric liquid crystal device was prepared and examined in the same manner as in Example 35 except that the thickness of the $SiO_2$ layer was reduced to 50 Å. As a result, short circuit frequently occurred between the upper and lower electrodes so that reproducible measurement results were not obtained.

Further, even in a device capable of measurement, undesirable phenomena such as local switching failure were observed.

COMPARATIVE EXAMPLE 9

A ferroelectric liquid crystal device was prepared and evaluated in the same manner as in Example 35 except that the polyimide layer was formed in a thickness of 800 Å. As a result, a remarkably worse optical responsive characteristic was observed as represented by the following results.

| 15° C. | 30° C. | 45° C. |
|---|---|---|
| 1850 μsec | 620 μsec | 445 μsec |

Further, the alignment in the device was somewhat disordered and satisfactory monodomain could not be obtained.

COMPARATIVE EXAMPLE 10

A ferroelectric liquid crystal device was prepared and evaluated in the same manner as in Example 35 except that the polyimide resin was replaced by polyvinyl alcohol resin ($\epsilon = 9.8$, available from Kuraray K.K.). As a result, the following results were obtained.

| 15° C. | 30° C. | 45° C. |
|---|---|---|
| 1200 μsec | 310 μsec | 150 μsec |

The ferroelectric liquid crystal device provided a contrast of 12 when driven at 30° C. but caused poor switching characteristic such as occurrence of flickering to provide a picture defect.

Further, the alignment in the device was disordered and the bistability after the termination of voltage application was not stable.

As is clear from the above results, the ferroelectric liquid crystal device according to the present invention has many advantageous features, such as an improved alignment control characteristic, an increased effect of preventing short circuit between the upper and lower electrodes, correction of image defects such as pixel flickering, improved bistability, and improved durability and stability against temperature and humidity.

EXAMPLES 43-54

Ferroelectric liquid crystal devices were prepared and examined in the same manner as in Example 17 except that one or both of the primer layer and the alignment control layer were replaced by those shown in the following Table 7.

TABLE 7

| | Primer layer | | | Alignment control layer | | |
|---|---|---|---|---|---|---|
| Example No. | Material | Thickness (Å) | $\epsilon_1$ | Material | Thickness (Å) | $\epsilon_2$ |
| 43 | SiO$_2$ | 500 | 3.8 | Polyamide-imide (Torlon, Mitsubishi Kasei) | 150 | 3.2 |
| 44 | Al$_2$O$_3$ | 600 | 10.0 | Xylene resin (Nihanol, Mitsubishi Gas Kagaku) | 180 | 4.6 |
| 45 | SiO$_2$ | 500 | 3.8 | Polyester (Bylon, Toyobo) | 160 | 3.4 |
| 46 | TiO$_2$ | 700 | 40 | Polycarbonate (Teijin Panlite, Teijin) | 170 | 3.1 |
| 47 | SiO$_2$ | 650 | 3.8 | Polyvinyl butyral (S-Lec β, Sekisui) | 280 | 3.3 |
| 48 | SiO$_2$ | 450 | 3.8 | Polyvinyl acetate (Gohsenyl, Nihon Gohsei) | 250 | 3.1 |
| 49 | Si$_3$N$_4$ | 550 | 6.6 | Polyamide (Amilan, Toray K.K.) | 220 | 3.8 |
| 50 | Si$_3$N$_4$ | 600 | 6.6 | Polystyrene (Hiresin, Hitachi Kasei) | 290 | 2.6 |
| 51 | SiO$_2$ | 500 | 3.8 | Cellulose (CAB, Eastman Kodak) | 330 | 3.2 |
| 52 | Si$_3$N$_4$ | 500 | 6.6 | Melamin resin (National-Light Melamin, Matsushita Denko) | 150 | 5.6 |
| 53 | SiO$_2$ | 550 | 3.8 | Urea resin (National-Light-Urea, Matsushita Denko) | 160 | 3.5 |
| 54 | SiO$_2$ | 600 | 3.8 | Acrylonitril (Cevian-V, Dicel) | 170 | 3.2 |

The thus prepared ferroelectric liquid crystal devices respectively showed a clear switching at a good contrast. The alignment in the devices was good, and a monodomain state was formed in each device. Further, bistability after the termination of the voltage application was also good, and no short circuit was observed in any device. Further when the devices were subjected to the environmental durability test in the same manner as in Example 35, whereby no change in evaluation result was observed.

EXAMPLES 55-68

Ferroelectric liquid crystal device were prepared and examined in the same manner as in Example 35 except that the ferroelectric liquid crystal composition was replaced by those described in the following Table 8 with their components in terms of Example Compound numbers as enumerated hereinbelow and the amounts thereof in weight parts. The measured data of optical response time at 30° C. are also listed in the Table 8.

TABLE 8

| Example No. | Composition Example compound No. (amount in weight parts) | | | | | | | | | | | | Optical response time (μsec) at 30° C. |
|---|---|---|---|---|---|---|---|---|---|---|---|---|---|
| 55 | No. | 5, | 13, | 24, | 45, | 61, | 69, | 78, | 126, | 140, | 155, | 175 | 225 |
| | (8, | 10, | 10, | 5, | 5, | 10, | 14, | 10, | 10, | 10, | 8) | | |
| 56 | No. | 2, | 10, | 16, | 29, | 35, | 85, | 92, | 116, | 134, | 178, | 208 | 230 |
| | (7, | 7, | 7, | 7, | 12, | 15, | 15, | 10, | 12, | 12, | 10) | | |
| 57 | No. | 4, | 27, | 44, | 54, | 73, | 80, | 98, | 123, | 129, | 138, | 179 | 195 |
| | (10, | 5, | 5, | 10, | 5, | 8, | 8, | 8, | 10, | 10, | 10) | | |
| 58 | No. | 7, | 26, | 37, | 55, | 65, | 75, | 90, | 117, | 121, | 127, | 171 | 240 |
| | (8, | 7, | 8, | 7, | 10, | 8, | 7, | 8, | 7, | 15, | 15) | | |
| 59 | No. | 3, | 23, | 41, | 55, | 68, | 97, | 108, | 132, | 144, | 159, | 173 | 260 |
| | (13, | 7, | 10, | 5, | 12, | 8, | 10, | 5, | 5, | 10, | 10) | | |
| 60 | No. | 6, | 11, | 14, | 21, | 72, | 89, | 116, | 118, | 136, | 138, | 154 | 220 |
| | (10, | 10, | 10, | 5, | 10, | 10, | 7, | 8, | 5, | 10. | 15) | | |
| 61 | No. | 4, | 20, | 32, | 46, | 70, | 79, | 93, | 94, | 122, | 130, | 150 | 260 |
| | (8, | 12, | 12, | 8, | 6, | 7, | 8, | 8, | 8, | 12, | 12) | | |
| 62 | No. | 6, | 30, | 66, | 74, | 90, | 117, | 123, | 149, | 160, | 172, | 207 | 240 |
| | (12, | 6, | 6, | 15, | 10, | 7, | 8, | 5, | 10, | 10. | 10) | | |
| 63 | No. | 2, | 28, | 50, | 69, | 86, | 93, | 117, | 119, | 138, | 164, | 169 | 285 |

TABLE 8-continued

| Example No. | Composition Example compound No. (amount in weight parts) | Optical response time (μsec) at 30° C. |
|---|---|---|
| 64 | No. (8, 8, 7, 8, 10, 10, 15, 15, 10, 10, 10) 8, 31, 64, 83, 95, 120, 144, 158, 175, 186 (5, 7, 8, 10, 5, 10, 7, 10, 12, 6) | 255 |
| 65 | No. (10, 8, 12, 10, 10, 8, 12, 12, 8, 10) 3, 30, 64, 79, 99, 120, 161, 175, 203, 207 | 270 |
| 66 | No. (15, 20, 15, 5, 5, 5, 10, 5, 5, 10) 78, 98, 117, 130, 170, 179, 186, 194, 201, 206 | 190 |
| 67 | No. (10, 10, 15, 7, 8, 10, 15, 7, 8, 10) 7, 40, 65, 70, 89, 100, 124, 130, 156, 180 | 245 |
| 68 | No. (8, 12, 20, 8, 10, 8, 8, 5, 5, 20) 22, 39, 67, 119, 138, 168, 176, 199, 205, 208 | 215 |

The thus prepared ferroelectric liquid crystal devices respectively showed a clear switching at a good contrast. The alignment in the devices was good, and a monodomain state was formed in each device. Further, bistability after the termination of the voltage application was also good, and no short circuit was observed in any device. Further when the devices were subjected to the environmental durability test in the same manner as in Example 35, whereby no change in evaluation result was observed. As is understood from the above Examples, according to the present invention, there is provided a ferroelectric liquid crystal device wherein a ferroelectric liquid crystal is disposed in a thin layer with a good alignment characteristic and improved short circuit prevention effect between the upper and lower electrodes, image defects such as pixel flickering have been diminished and good bistability is shown.

What is claimed is:

1. A ferroelectric liquid crystal device, comprising: a pair of opposite electrodes at least one of which is coated with a primer layer and an alignment control film formed on the primer layer, and a ferro-electric liquid crystal disposed between the opposite electrodes; wherein said primer layer has a thickness $d_1$ and comprises a material having a dielectric constant $\epsilon_1$, and said alignment control film has a thickness $d_2$ and comprises a material having a dielectric constant $\epsilon_2$, satisfying the relationships of $d_1 > d_2$ and $\epsilon_1 > \epsilon_2$; and said ferroelectric liquid crystal comprises at least one mesomorphic compound represented by the formula (1) below:

$$R_1-A_1-X-A_2-R_2 \quad (1),$$

wherein $A_1$ and $A_2$ respectively denote a 6-membered ring-containing divalent group; and X denotes a single bond or a divalent chain group; $R_1$ and $R_2$ respectively denote a branch or linear chain group, $R_1$ and $R_2$ being the same or different and at least one of $R_1$ and $R_2$ has at least one substituent selected from the group consisting of halogen atom, alkoxy group, trifluoromethyl group and cyano group.

2. A device according to claim 1, wherein the groups $R_1$ and $R_2$ are respectively selected from branched or linear alkyl groups, and alkoxy groups, acyl groups, acyloxy groups, alkoxycarbonyl groups and alkoxycarbonyloxy group containing a branched or linear alkyl unit.

3. A device according to claim 1, wherein at least one of $R_1$ and $R_2$ in the formula (1) is an optically active chain group having an asymmetric carbon atom.

4. A device according to claim 1, wherein X in the formula (1) is selected from single bond, —O—, —S—,

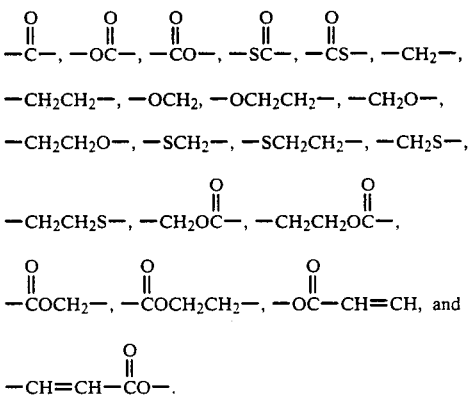

5. A device according to claim 1, wherein said primer layer comprises at least one material selected from the group consisting of silicon nitride, silicon nitride containing hydrogen, silicon carbide, silicon carbide containing hydrogen; silicon oxide, boron nitride, boron nitride containing hydrogen, cerium oxide, aluminum oxide, zirconium oxide, titanium oxide, and magnesium fluoride.

6. A device according to claim 1, wherein said alignment control film comprises at least one material selected from the group consisting of polyvinyl alcohol, polyimide, polyamide-imide, polyester-imide, polyparaxylylene, polyester, polycarbonate, polyvinyl acetal, polyvinyl chloride, polyamide, polystyrene, polyethylene, cellulose resin, melamine resin, urea resin, acrylic resin and photoresist resin.

7. A device according to claim 1, wherein the thickness of the alignment control film is 500 Å or smaller.

8. A device according to claim 1, wherein the dielectric constant $\epsilon_2$ of the material constituting the alignment control film is 10.0 or below.

9. A device according to claim 1, wherein said ferroelectric liquid crystal comprises a chiral smectic liquid crystal.

10. A device according to claim 1, wherein said alignment control film is formed from a low-resistivity dielectric material.

11. A device according to claim 10, wherein said low-resistivity dielectric material has a volume resistivity of $10^{10}$ Ω·cm or lower.

12. A ferroelectric liquid crystal device, comprising: a pair of opposite electrodes at least one of which is coated with a primer layer and an alignment control film formed on the primer layer, and a ferroelectric liquid crystal disposed between the opposite electrodes;

wherein said primer layer has a thickness $d_1$ and comprises a material having a dielectric constant $\epsilon_1$, said alignment control film has a thickness $d_2$ and comprises a material having a dielectric constant $\epsilon_2$, satisfying the relationships of: $d_1 > d_2$ and $\epsilon_1 > \epsilon_2$; and said ferroelectric liquid crystal comprises at least one mesomorphic compound represented by the formula (1) below:

$$R_1-A_1-X-A_2-R_2 \qquad (1),$$

wherein $A_1$ and $A_2$ respectively denote a 6-membered ring-containing divalent group; and X denotes a single bond or a divalent chain group; $R_1$ and $R_2$ respectively denote a branch or linear chain group, $R_1$ and $R_2$ being the same or different; wherein at least one of $R_1$ and $R_2$ in the formula (1) is a group represented by the formula (2) below:

$$-Y+CH_2\overline{)_m}\overset{Z}{\underset{*}{C}}H+CH_2\overline{)_n}R_3, \qquad (2)$$

wherein Y denotes a single bond, $$-O-, \overset{O}{\underset{\|}{-C-}}, \overset{O}{\underset{\|}{-OC-}}, \overset{O}{\underset{\|}{-CO-}}, \overset{O}{\underset{\|}{-OCO-}},$$

$$-CH_2O-, -CH_2CH_2O-, \overset{O}{\underset{\|}{-CH_2OC-}},$$

$$\overset{O}{\underset{\|}{-CH_2CH_2OC-}}, \overset{O}{\underset{\|}{-CH_2CO-}}, \overset{O}{\underset{\|}{-CH_2CH_2CO-}}, \text{ or}$$

$$\overset{O}{\underset{\|}{-CH=CH-CO-}};$$

of 0-8; n denotes 0 or 1; $R_3$ denotes a branched or linear alkyl group of 1-18 carbon atoms or an alkoxy or alkoxycarbonyl group containing a branched or linear alkyl group of 1-18 carbon atoms, wherein $R_3$ has at least one substituent selected from the group consisting of halogen atom, alkoxy group, trifluoromethyl group and cyano group; Z denotes methyl, halogen, cyano or trifluoromethyl group; and * denotes the location of an asymmetric carbon atom.

13. A ferroelectric liquid crystal device, comprising: a pair of opposite electrodes at least one of which is coated with a primer layer and an alignment control film formed on the primer layer, and a ferroelectric liquid crystal disposed between the opposite electrodes: wherein said primer layer has a thickness $d_1$ and comprises a material having a dielectric constant $\epsilon_1$, and said alignment control film has a thickness $d_2$ and comprises a material having a dielectric constant $\epsilon_2$, satisfying the relationships of: $d_1 > d_2$ and $\epsilon_1 > \epsilon_2$; and said ferroelectric liquid crystal comprises at least one mesomorphic compound represented by the formula (1) below:

$$R_1-A_1-X-A_2-R_2 \qquad (1),$$

wherein $R_1$ and $R_2$ respectively denote a branch or linear chain group having a substituent, $R_1$ and $R_2$ being the same or different; X denotes a single bond or a divalent chain group; and $A_1$ and $A_2$ respectively denote a 6-membered ring-containing divalent group; wherein at least one of $A_1$ and $A_2$ in the formula (1) is represented by the following formula (3):

$$+A_3)_p(A_4)_q \qquad (3),$$

wherein p and q are respectively 0, 1 or 2; and $A_3$ and $A_4$ are respectively one of the following groups:

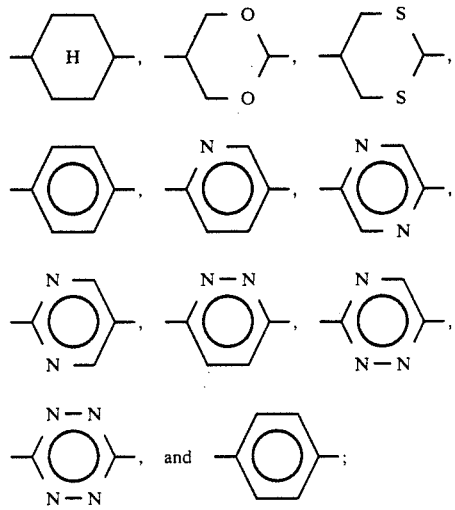

wherein $A_3$ and $A_4$ in the formula (3) have at least one substituent selected from the group consisting of halogen atom, alkoxy group, trifluoromethyl group and cyano group.

14. A device according to claim 12 or 13, wherein said primer layer comprises at least one material selected from the group consisting of silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, and magnesium fluoride.

15. A device according to claim 12 or 13, wherein said alignment control film comprises at least one material selected from the group consisting of polyvinyl alcohol, polyimide, polyamide-imide, polyester-imide, polyparaxylylene, polyester, polycarbonate, polyvinyl acetal, polyvinyl chloride, polyamide, polystyrene, polyethylene, cellulose resin, melamine resin, urea resin, acrylic resin and photoresist resin.

16. A device according to claim 12 or 13, wherein the thickness of the alignment control film is 500 Å or smaller.

17. A device according to claim 12 or 13, wherein the dielectric constant $\epsilon_2$ of the material constituting the alignment control film is 10.0 or below.

18. A device according to claim 12 or 13, wherein said ferroelectric liquid crystal comprises a chiral smectic liquid crystal.

* * * * *

UNITED STATES PATENT AND TRADEMARK OFFICE
CERTIFICATE OF CORRECTION

PATENT NO. : 5,165,076

DATED : November 17, 1992

INVENTOR(S) : AKIRA TSUBOYAMA, ET AL.

It is certified that error appears in the above-identified patent and that said Letters Patent is hereby corrected as shown below:

On title page,

IN [56] REFERENCES CITED

Under FOREIGN PATENT DOCUMENTS, "00035631 1/1979 Japan" should read --0003563 1/1979 Japan--.

COLUMN 2

Line 3, "optical" should read --an optical--.
Line 25, "or" should be deleted.
Line 40, "is" should be deleted.

COLUMN 47

Line 3, "1 hour of" should be deleted.
Line 36, "pyridine in" should read --pyridine were charged in--.
Line 62, "1 hour of" should be deleted.

COLUMN 49

Line 55, "a" (second occurrence) should be deleted.
Line 56, "is" should read --are--.

COLUMN 50

Line 26, "when" should be deleted.
Line 59, "$C_{Lc}=((1C_{cell})-(1/Ci)^{-1}$" should read --$C_{Lc}=((1C_{cell})-(1/Ci))^{-1}$--.

COLUMN 57

Line 41, "lack" should read --each--.
Line 57, "charging" should read --changes--.

UNITED STATES PATENT AND TRADEMARK OFFICE
CERTIFICATE OF CORRECTION

PATENT NO. : 5,165,076

DATED : November 17, 1992

INVENTOR(S) : AKIRA TSUBOYAMA, ET AL.

It is certified that error appears in the above-identified patent and that said Letters Patent is hereby corrected as shown below:

COLUMN 64

Line 17, insert: --Example Compound No.--.

COLUMN 66

Lines 33-34, "Example Compound No." should read
--¶ Example Compound No.--.

COLUMN 68

Line 36, insert: --Example Compound No.--.

COLUMN 69

In Example Compound No. (208),

COLUMN 74

Line 68, "electrodes:" should read --electrodes;--.

COLUMN 75

Line 37, "of 0-8;" should read --m denotes an integer
of 0-8;--.

UNITED STATES PATENT AND TRADEMARK OFFICE
CERTIFICATE OF CORRECTION

PATENT NO. : 5,165,076

DATED : November 17, 1992

INVENTOR(S) : AKIRA TSUBOYAMA, ET AL.

It is certified that error appears in the above-identified patent and that said Letters Patent is hereby corrected as shown below:

<u>COLUMN 75</u>

Line 50, "electrodes:" should read --electrodes;--.

Signed and Sealed this

Eighteenth Day of January, 1994

Attest:

BRUCE LEHMAN

Attesting Officer     Commissioner of Patents and Trademarks